(12) United States Patent
Tetsuka et al.

(10) Patent No.: US 11,407,473 B2
(45) Date of Patent: Aug. 9, 2022

(54) OPERATING DEVICE AND ASSIST DRIVING SYSTEM FOR HUMAN-POWERED VEHICLE

(71) Applicant: SHIMANO INC., Sakai (JP)

(72) Inventors: Toshio Tetsuka, Sakai (JP); Takafumi Nishino, Sakai (JP); Takehiko Nakajima, Sakai (JP)

(73) Assignee: SHIMANO INC., Sakai (JP)

( * ) Notice: Subject to any disclaimer, the term of this patent is extended or adjusted under 35 U.S.C. 154(b) by 333 days.

(21) Appl. No.: 16/525,518

(22) Filed: Jul. 29, 2019

(65) Prior Publication Data
US 2021/0031870 A1 Feb. 4, 2021

(51) Int. Cl.
*B62M 6/45* (2010.01)
*B62J 99/00* (2020.01)
*B62K 23/02* (2006.01)
*B62J 45/00* (2020.01)

(52) U.S. Cl.
CPC ............... *B62M 6/45* (2013.01); *B62J 99/00* (2013.01); *B62K 23/02* (2013.01); *B62J 45/00* (2020.02)

(58) Field of Classification Search
CPC .......... B62K 23/02; B62J 45/00; B62J 99/00; B62L 3/02; B62M 25/08; B62M 6/45
See application file for complete search history.

(56) References Cited

U.S. PATENT DOCUMENTS

| | | | | |
|---|---|---|---|---|
| 4,637,274 A * | 1/1987 | Goldenfeld | ............... | B62M 6/45 74/625 |
| 7,730,803 B2 * | 6/2010 | Takamoto | ............... | B62M 25/08 74/473.12 |
| 8,781,679 B2 * | 7/2014 | Ikemoto | ................. | B62K 25/28 701/37 |
| 8,781,680 B2 * | 7/2014 | Ichida | ....................... | B62J 99/00 701/37 |
| 8,886,417 B2 * | 11/2014 | Jordan | ................... | B62M 9/132 701/51 |
| 8,909,424 B2 * | 12/2014 | Jordan | .................. | H04W 74/08 701/36 |
| 8,931,365 B2 * | 1/2015 | Fujii | ..................... | B62M 25/08 74/502.2 |
| 9,229,712 B2 * | 1/2016 | Takamoto | ............. | B62K 25/04 |
| 9,399,500 B1 * | 7/2016 | Hashimoto | ............ | G08C 17/02 |

(Continued)

FOREIGN PATENT DOCUMENTS

| CN | 105564554 | 5/2016 |
|---|---|---|
| CN | 108116615 | 6/2018 |

(Continued)

*Primary Examiner* — Tony H Winner
*Assistant Examiner* — Michael R Stabley
(74) *Attorney, Agent, or Firm* — Mori & Ward, LLP

(57) ABSTRACT

An operating device for a human-powered vehicle comprises a base member, an operating member, and an assist operating interface. The base member includes a coupling end, a free end, and a grip portion. The coupling end is configured to be coupled to a handlebar. The free end is opposite to the coupling end. The grip portion is provided between the coupling end and the free end. The operating member is pivotally coupled to the base member about a pivot axis. The assist operating interface is configured to receive a first user input indicating that an assist driving unit generates a temporary assist driving force for a limited period corresponding to an operation of the first user input.

28 Claims, 27 Drawing Sheets

(56) References Cited

U.S. PATENT DOCUMENTS

| | | | | |
|---|---|---|---|---|
| 9,463,845 | B2* | 10/2016 | Kuroda | F16H 63/304 |
| 9,522,714 | B2* | 12/2016 | Komatsu | B62M 25/08 |
| 9,682,743 | B2* | 6/2017 | Miyoshi | B62J 99/00 |
| 10,363,992 | B2* | 7/2019 | Watarai | B62M 9/122 |
| 10,457,350 | B2* | 10/2019 | Kasai | B62K 23/02 |
| 10,513,307 | B2* | 12/2019 | Komatsu | B62L 3/023 |
| 10,556,634 | B2* | 2/2020 | Komatsu | B62J 1/08 |
| 10,556,638 | B2* | 2/2020 | Sato | B62M 9/12 |
| 10,807,671 | B2* | 10/2020 | Usui | B62M 6/45 |
| 2009/0315692 | A1* | 12/2009 | Miki | B62K 23/02 |
| | | | | 340/432 |
| 2012/0221203 | A1* | 8/2012 | Ichida | B62K 25/04 |
| | | | | 701/37 |
| 2012/0253600 | A1* | 10/2012 | Ichida | B62K 19/36 |
| | | | | 701/37 |
| 2012/0253601 | A1* | 10/2012 | Ichida | B60G 17/0195 |
| | | | | 701/37 |
| 2014/0070930 | A1* | 3/2014 | Hara | B62J 3/00 |
| | | | | 340/432 |
| 2014/0345411 | A1* | 11/2014 | Miki | B62M 25/08 |
| | | | | 74/473.12 |
| 2015/0284049 | A1* | 10/2015 | Shipman | B62K 23/06 |
| | | | | 74/473.12 |
| 2016/0016638 | A1 | 1/2016 | Miyoshi et al. | |
| 2018/0148127 | A1 | 5/2018 | Sato et al. | |

FOREIGN PATENT DOCUMENTS

| | | |
|---|---|---|
| CN | 207773360 U | 8/2018 |
| JP | 2016-22798 | 2/2016 |
| JP | 2018-89989 | 6/2018 |

* cited by examiner

OPERATING DEVICE AND ASSIST DRIVING SYSTEM FOR HUMAN-POWERED VEHICLE

BACKGROUND OF THE INVENTION

Field of the Invention

The present invention relates to an operating device and an assist driving system for a human-powered vehicle.

Discussion of the Background

A human-powered vehicle includes an assist driving device configured to assist a human power of the human-powered vehicle.

SUMMARY OF THE INVENTION

In accordance with a first aspect of the present invention, an operating device for a human-powered vehicle comprises a base member, an operating member, and an assist operating interface. The base member includes a coupling end, a free end, and a grip portion. The coupling end is configured to be coupled to a handlebar. The free end is opposite to the coupling end. The grip portion is provided between the coupling end and the free end. The operating member is pivotally coupled to the base member about a pivot axis. The assist operating interface is configured to receive a first user input indicating that an assist driving unit generates a temporary assist driving force for a limited period corresponding to an operation of the first user input.

With the operating device according to the first aspect, it is possible to generate the temporary assist driving force for the limited period by operating the assist operating interface of the operating device. Thus, it is possible to temporarily obtain or increase the driving force of the human-powered vehicle.

In accordance with a second aspect of the present invention, an operating device for a human-powered vehicle comprises a base member, an operating member, and an assist operating interface. The operating member is pivotally coupled to the base member about a pivot axis. The operating member includes a lower end and an upper end that is closer to the base member than the lower end. The lower end is positioned below the upper end while the operating device is mounted to a handlebar. The assist operating interface is configured to receive a first user input indicating that an assist driving unit generates a temporary assist driving force for a limited period corresponding to an operation of the first user input.

With the operating device according to the second aspect, it is possible to generate the temporary assist driving force for the limited period with the first user input of the assist operating interface. Thus, it is possible to temporarily obtain or increase the motive power of the human-powered vehicle.

In accordance with a third aspect of the present invention, the operating device according to any the first or second aspect is configured so that the assist operating interface configured to receive a second user input indicating that an assist driving unit changes an assist ratio which is a ratio of an assist driving force generated by the assist driving unit to the human power.

With the operating device according to the third aspect, it is possible to obtain the assist driving force to assist the human power with the second user input of the assist operating interface. Thus, it is possible to utilize the assist driving force and the temporary assist driving force.

In accordance with a fourth aspect of the present invention, the operating device according to the third aspect is configured so that the assist operating interface of the operating device includes an electrical switch configured to receive the first user input with a first manner and the second user input with a second manner different from the first manner.

With the operating device according to the fourth aspect, it is possible to share the electrical switch between the assist driving force and the temporary assist driving force. This can simplify the structure of the assist operating interface.

In accordance with a fifth aspect of the present invention, the operating device according to the fourth aspect is configured so that the first manner includes a first operate time during which the electrical switch is operated. The second manner includes a second operate time during which the electrical switch is operated. The second operate time is different from the first operate time.

With the operating device according to the fifth aspect, it is possible to share the electrical switch between the assist driving force and the temporary assist driving force. This can simplify the structure of the assist operating interface.

In accordance with a sixth aspect of the present invention, the operating device according to the fifth aspect is configured so that the first operate time is longer than the second operate time.

With the operating device according to the sixth aspect, it is possible to reliably distinguish the operation of the electrical switch between the first user input and the second user input while the electrical switch is shared between the first user input and the second user input.

In accordance with a seventh aspect of the present invention, the operating device according to any one of the third to sixth aspects is configured so that the assist operating interface includes a first electrical switch configured to receive the first user input and a second electrical switch configured to receive the second user input.

With the operating device according to the seventh aspect, it is possible to reliably distinguish the operation of the electrical switch between the first user input and the second user input using the first electrical switch and the second electrical switch.

In accordance with an eighth aspect of the present invention, the operating device according to any one of the third to seventh aspects further comprises a controller configured to generate, based on the first user input, a first control signal indicating that the assist driving unit generates the temporary assist driving force for the limited period. The controller is configured to generate, based on the second user input, a second control signal indicating that the assist driving unit changes the assist ratio.

With the operating device according to the eighth aspect, it is possible to reliably control the assist driving unit using the first control signal and the second control signal generated by the controller.

In accordance with a ninth aspect of the present invention, the operating device according to the eighth aspect is configured so that the controller is configured to generate the first control signal for a first period during which the assist operating interface receives the first user input.

With the operating device according to the ninth aspect, it is possible to adjust the limited period for which the temporary assist driving force is generated.

In accordance with a tenth aspect of the present invention, the operating device according to the eighth aspect is configured so that the controller is configured to generate the first control signal for a predetermined period regardless of a first period during which the assist operating interface receives the first user input.

With the operating device according to the tenth aspect, it is possible to ensure the predetermined period for which the first control signal is generated with shortening the first period.

In accordance with an eleventh aspect of the present invention, the operating device according to any one of the eighth to tenth aspects is configured so that the controller is configured to generate the first control signal in response to an initiation of the first user input. The controller is configured to generate a first control termination signal indicating that the assist driving unit stops generating the temporary assist driving force in accordance with one of a termination of the first user input and a lapse of the limited period from the initiation of the first user input.

With the operating device according to the eleventh aspect, it is possible to save power consumption of the operating device with temporarily obtaining or increasing the driving force of the human-powered vehicle.

In accordance with a twelfth aspect of the present invention, the operating device according to any one of the eighth to eleventh aspects further comprises a communication port configured to be connected to a cable, the communication port being electrically connected to the controller to transmit the first control signal through the communication port.

With the operating device according to the twelfth aspect, it is possible to utilize the cable to transmit the first control signal to the assist driving unit.

In accordance with a thirteenth aspect of the present invention, the operating device according to the twelfth aspect is configured so that the communication port is electrically connected to the controller to transmit the second control signal through the communication port.

With the operating device according to the thirteenth aspect, it is possible to utilize the cable to transmit the second control signal to the assist driving unit.

In accordance with a fourteenth aspect of the present invention, the operating device according to any one of the eighth to thirteenth aspects further comprises a wireless communicator configured to wirelessly transmit the first control signal.

With the operating device according to the fourteenth aspect, it is possible to utilize wireless technology to transmit the first control signal to the assist driving unit.

In accordance with a fifteenth aspect of the present invention, the operating device according to the fourteenth aspect further comprises a wireless communicator configured to wirelessly transmit the second control signal.

With the operating device according to the fifteenth aspect, it is possible to utilize wireless technology to transmit the second control signal to the assist driving unit.

In accordance with a sixteenth aspect of the present invention, an assist driving system comprises the operating device according to at least one of the first to fifteenth aspects, the assist driving unit configured to generate an assist driving force to assist the human power, and an assist controller configured to control the assist driving unit based on the first user input.

With the assist driving system according to the sixteenth aspect, it is possible to generate the temporary assist driving force for the limited period by operating the assist operating interface of the operating device. Thus, it is possible to temporarily obtain or increase the driving force of the human-powered vehicle.

In accordance with a seventeenth aspect of the present invention, the assist driving system according to the sixteenth aspect is configured so that the assist operating interface is configured to receive a second user input indicating that an assist driving unit changes an assist ratio which is a ratio of an assist driving force generated by the assist driving unit to a human power. The assist controller configured to control the assist driving unit based on the first user input and the second user input.

With the assist driving system according to the seventeenth aspect, it is possible to obtain the assist driving force to assist the human power with the second user input of the assist operating interface. Thus, it is possible to utilize the assist driving force and the temporary assist driving force.

In accordance with an eighteenth aspect of the present invention, the assist driving system according to the sixteenth or seventeenth aspect is configured so that the assist controller is configured to control the assist driving unit to generate the temporary assist driving force in response to the first user input.

With the assist driving system according to the eighteenth aspect, it is possible to temporarily obtain or increase the driving force of the human-powered vehicle.

In accordance with a nineteenth aspect of the present invention, the assist driving system according to any one of the sixteenth to eighteenth aspects is configured so that the assist controller is configured to select one assist ratio of a plurality of assist ratios based on the second user input. The assist controller is configured to control the assist driving unit to generate an assist driving force based on an assist ratio selected by the assist controller.

With the assist driving system according to the nineteenth aspect, it is possible to utilize the assist driving force and the temporary assist driving force.

In accordance with a twentieth aspect of the present invention, the assist driving system according to any one of the fifteenth to nineteenth aspects is configured so that the operating device comprises a controller. The controller is configured to generate, based on the first user input, a first control signal indicating that the assist driving unit generates the temporary assist driving force for the limited period. The controller is configured to generate, based on the second user input, a second control signal indicating that the assist driving unit changes the assist ratio.

With the assist driving system according to the twentieth aspect, it is possible to reliably control the assist driving unit to generate the temporary assist driving force and the assist driving force.

In accordance with a twenty-first aspect of the present invention, the assist driving system according to the twentieth aspect is configured so that the controller is configured to generate the first control signal for a first period during which the assist operating interface receives the first user input.

With the assist driving system according to the twenty-first aspect, it is possible to adjust the limited period for which the temporary assist driving force is generated.

In accordance with a twenty-second aspect of the present invention, the assist driving system according to the twentieth aspect is configured so that the controller is configured to generate the first control signal for a predetermined period regardless of a first period during which the assist operating interface receives the first user input.

With the assist driving system according to the twenty-second aspect, it is possible to ensure the predetermined period for which the first control signal is generated with shortening the first period.

In accordance with a twenty-third aspect of the present invention, the assist driving system according to any one of the twentieth to twenty-second aspects is configured so that the assist controller is configured to select one assist ratio of a plurality of assist ratios based on the second control signal. The assist controller is configured to control the assist driving unit to generate an assist driving force based on an assist ratio selected by the assist controller.

With the assist driving system according to the twenty-third aspect, it is possible to obtain the assist driving force to assist the human power based on the selected assist ratio.

In accordance with a twenty-fourth aspect of the present invention, the assist driving system according to the twenty-third aspect is configured so that the assist controller is configured to control the assist driving unit to generate the assist driving force based on the assist ratio selected by the assist controller while the assist controller does not receive the first control signal.

With the assist driving system according to the twenty-fourth aspect, it is possible to utilize each of the assist driving force and the temporary assist driving force depending on the situation.

In accordance with a twenty-fifth aspect of the present invention, the assist driving system according to any one of the twentieth to twenty-fourth aspects is configured so that the assist controller is configured to control the assist driving unit to generate the temporary assist driving force in response to the first control signal.

With the assist driving system according to the twenty-fifth aspect, it is possible to reliably generate the temporary assist driving force using the first control signal.

In accordance with a twenty-sixth aspect of the present invention, the assist driving system according to the twenty-fifth aspect is configured so that the assist controller is configured to control the assist driving unit to change a driving force generated by the assist driving unit from the temporary assist driving force to the assist driving force generated based on the assist ratio one of after a termination of the first control signal and after a predetermined period elapses from the termination of the first control signal.

With the assist driving system according to the twenty-sixth aspect, it is possible to automatically change the driving force from the temporary assist driving force to the assist driving force.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
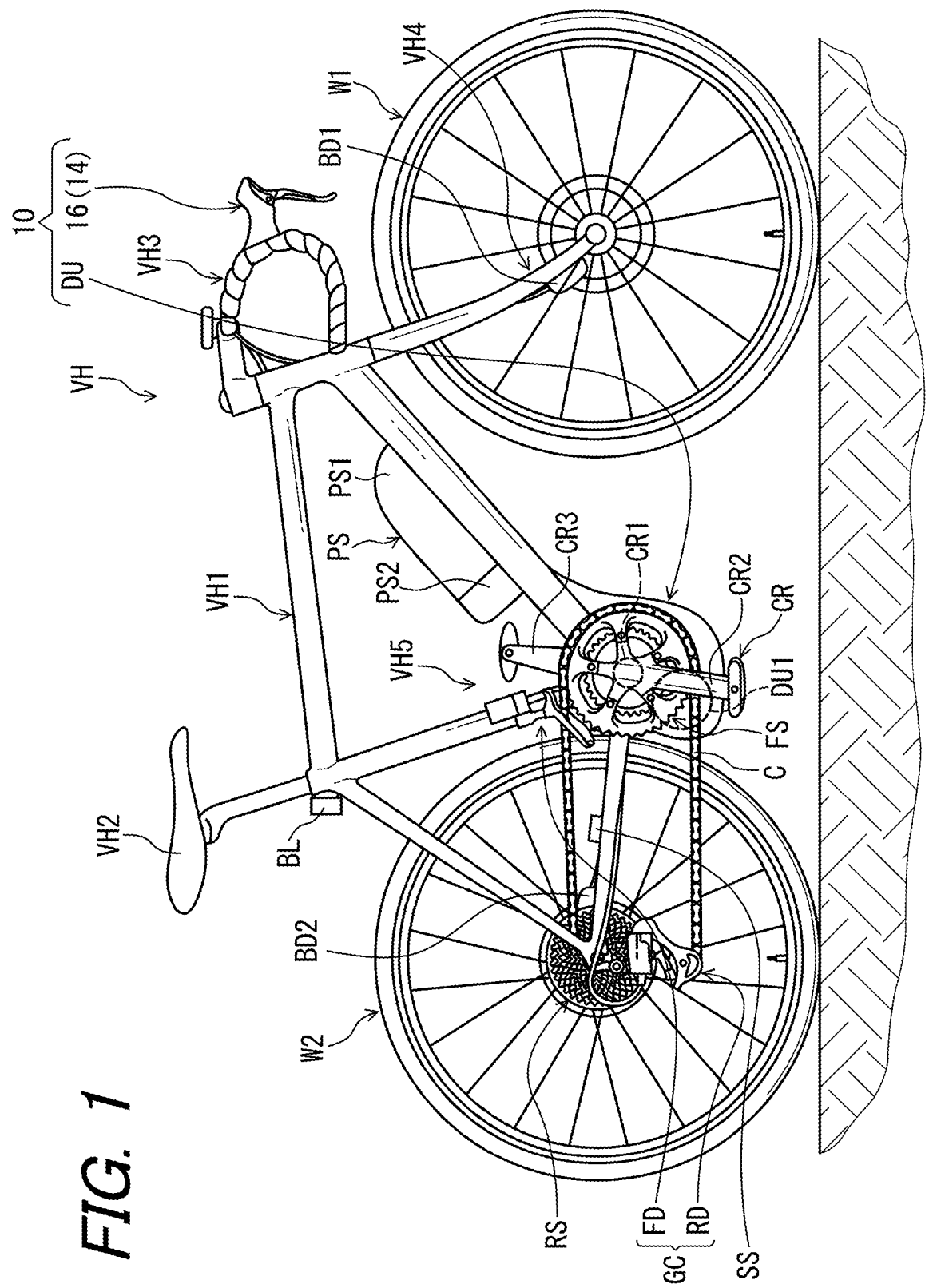
FIG. 1 is a side elevational view of a human-powered vehicle including an assist driving system in accordance with a first embodiment.

The embodiment(s) will now be described with reference to the accompanying drawings, wherein like reference numerals designate corresponding or identical elements throughout the various drawings.

First Embodiment

Referring initially to FIG. 1, a human-powered vehicle VH includes an assist driving system 10 in accordance with a first embodiment. For example, the human-powered vehicle VH is a vehicle to travel with a motive power including at least a human power of a user who rides the human-powered vehicle VH (i.e., rider). The human-powered vehicle VH has an arbitrary number of wheels. For example, the human-powered vehicle VH has at least one wheel. In this embodiment, the human-powered vehicle VH preferably has a smaller size than that of a four-wheeled automobile. However, the human-powered vehicle VH can have an arbitrary size. Examples of the human-powered vehicle VH include a bicycle, a tricycle, and a kick scooter. In this embodiment, the human-powered vehicle VH is a bicycle. An electric assisting system including an electric motor can be applied to the human-powered vehicle VH (e.g., the bicycle) to assist muscular motive power of the user. Namely, the human-powered vehicle VH can be an E-bike. While the human-powered vehicle VH is illustrated as a road bike, the assist driving system 10 can be applied to time trial bikes or any type of human-powered vehicles.

The human-powered vehicle VH further includes a vehicle body VH1, a saddle VH2, a handlebar VH3, a front fork VH4, a drive train VH5, a first brake device BD1, a second brake device BD2, a first wheel W1, and a second wheel W2. The front fork VH4 is rotatably mounted to the vehicle body VH1. The handlebar VH3 is secured to the front fork VH4. The first wheel W1 is rotatably coupled to the front fork VH4. The second wheel W2 is rotatably coupled to the vehicle body VH1. The first brake device BD1 is configured to apply a braking force to the first wheel W1. The second brake device BD2 is configured to apply a braking force to the second wheel W2.

In the present application, the following directional terms "front," "rear," "forward," "rearward," "left," "right," "transverse," "upward" and "downward" as well as any other similar directional terms refer to those directions which are determined on the basis of a user (e.g., a rider) who is in the user's standard position (e.g., on the saddle VH2 or a seat) in the human-powered vehicle VH with facing the handlebar VH3. Accordingly, these terms, as utilized to describe the assist driving system 10 or other components, should be interpreted relative to the human-powered vehicle VH equipped with the assist driving system 10 as used in an upright riding position on a horizontal surface.

The drive train VH5 includes a crank assembly CR, a front sprocket assembly FS, a rear sprocket assembly RS, a chain C, and a gear changing device GC. The front sprocket assembly FS is secured to the crank assembly CR and includes a plurality of front sprockets. The rear sprocket assembly RS is rotatably mounted to the vehicle body VH1 and includes a plurality of rear sprockets. The chain C is engaged with the front sprocket assembly FS and the rear sprocket assembly RS. The gear changing device GC includes a gear changing unit FD and a gear changing unit RD. The gear changing unit FD is mounted to the vehicle body VH1 and is configured to shift the chain C relative to the front sprocket assembly FS to change a gear position of the gear changing unit FD. The gear changing unit RD is mounted to the vehicle body VH1 and is configured to shift the chain C relative to the rear sprocket assembly RS to change a gear position of the gear changing unit RD. The gear changing device GC has a gear ratio. The gear ratio is a ratio of a rotational speed of the rear sprocket assembly RS to a rotational speed of the front sprocket assembly FS. In this embodiment, the gear changing unit FD includes a derailleur. The gear changing unit RD includes a derailleur. However, each of the gear changing unit FD and the gear changing unit RD can include another device such as an internal gear hub. At least one of the gear changing units FD and RD can be omitted from the drive train VH5. The human-powered vehicle VH includes a speed sensor SS. The speed sensor SS is configured to sense a rotational speed of the second wheel W2.

The assist driving system 10 comprises an assist driving unit DU. The assist driving unit DU is configured to generate an assist driving force to assist a human power. The assist driving unit DU includes an assist motor DU1 configured to impart propulsion to the human-powered vehicle VH. The crank assembly CR includes a crank axle CR1 and crank arms CR2 and CR3. The crank arms CR2 and CR3 are secured to the crank axle CR1. For example, the assist driving unit DU is configured to apply an assist driving force to the drive train VH5. The crank assembly CR is configured to receive the human power including a pedaling force.

Figure 2:
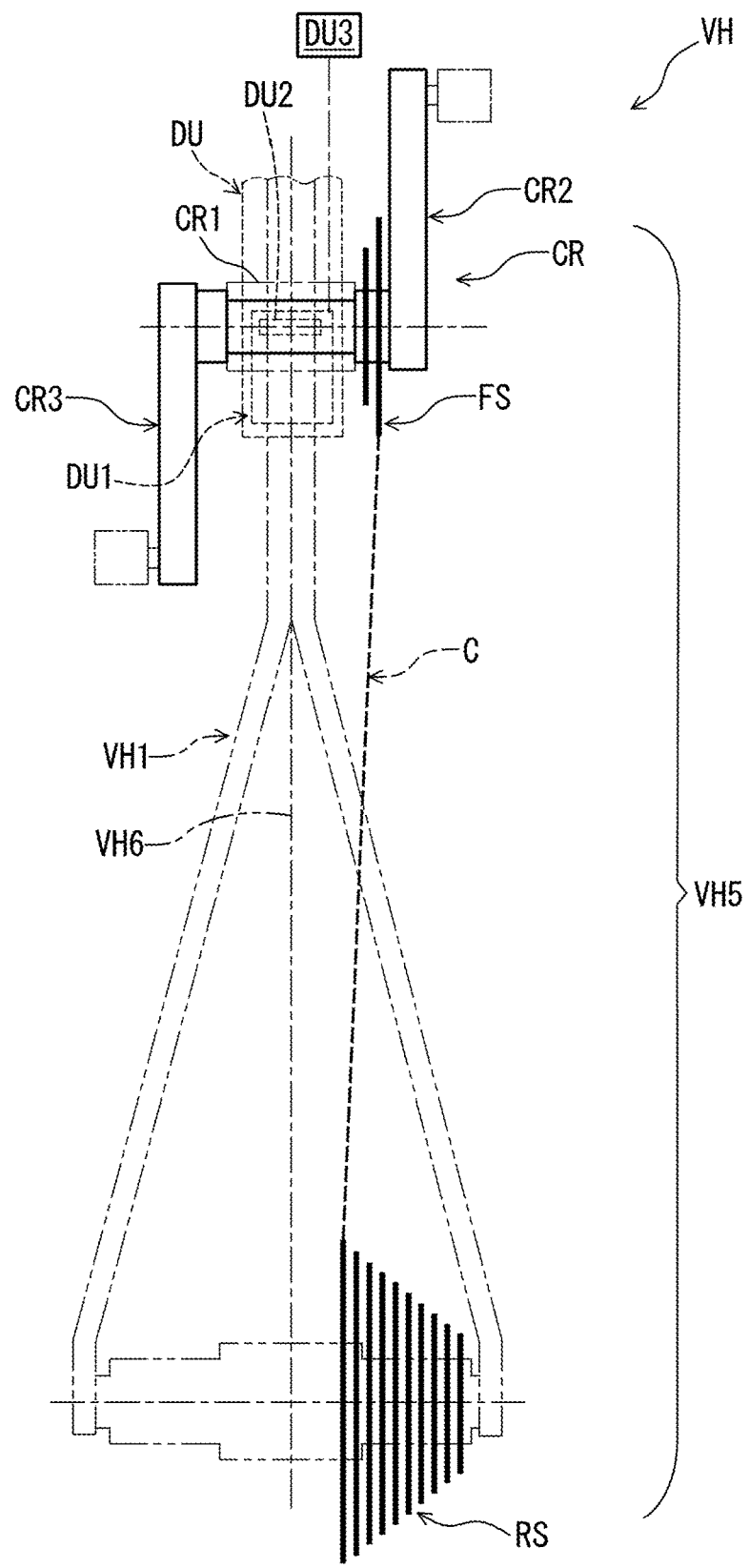
FIG. 2 is a schematic diagram of a drive train of the human-powered vehicle illustrated in FIG. 1.

As seen in FIG. 2, the assist driving unit DU comprises a pedaling-force sensor DU2 configured to sense a pedaling force applied to the crank assembly CR from a rider. The pedaling-force sensor DU2 is configured to sense the human power HP applied to the crank assembly CR from the rider. The assist driving unit DU includes a motor controller DU3 configured to control the assist motor DU1 to add the assist driving force F2 to the drive train VH5 based on an assist ratio and the pedaling force sensed by the pedaling-force sensor DU2. The motor controller DU3 is configured to select and/or calculate the assist ratio. However, the motor controller DU3 can be configured to control the assist motor DU1 to add the assist driving force F2 to the drive train VH5 regardless of the assist ratio and/or the pedaling force. For example, the motor controller DU3 is configured to control the assist motor DU1 to add the assist driving force F2 to the crank assembly CR based on a user input received by the assist driving system 10.

As seen in FIG. 1, the human-powered vehicle VH includes a power supply PS and a brake lamp BL. The power supply PS is electrically connected to the assist driving unit DU, the gear changing device GC, and the brake lamp BL to supply electricity to the assist driving unit DU, the gear changing device GC, and the brake lamp BL. The power supply PS includes a battery PS1 and a battery holder PS2. Examples of the battery PS1 include a primary battery such as a lithium manganese dioxide battery, and a secondary battery such as a lithium-ion secondary battery. In this embodiment, the battery PS1 is the secondary battery. The battery PS1 is detachably attached to the battery holder PS2 to supply electricity to the assist driving unit DU, the gear changing device GC, and the brake lamp BL. For example, the battery PS1 a replaceable and/or rechargeable battery. The battery holder PS2 is electrically connected to the assist driving unit DU, the gear changing device GC, and the brake lamp BL to supply electricity from the battery PS1 to the assist driving unit DU, the gear changing device GC, and the brake lamp BL. In this embodiment, the power supply PS is mounted to the vehicle body VH1. However, the location of the power supply PS is not limited to this embodiment. The power supply PS can be provided in the vehicle body VH1. The human-powered vehicle VH can include another power supply configured to supply electricity to the assist driving unit DU, the gear changing device GC, and the brake lamp BL instead of or in addition to the power supply PS.

Figure 3:
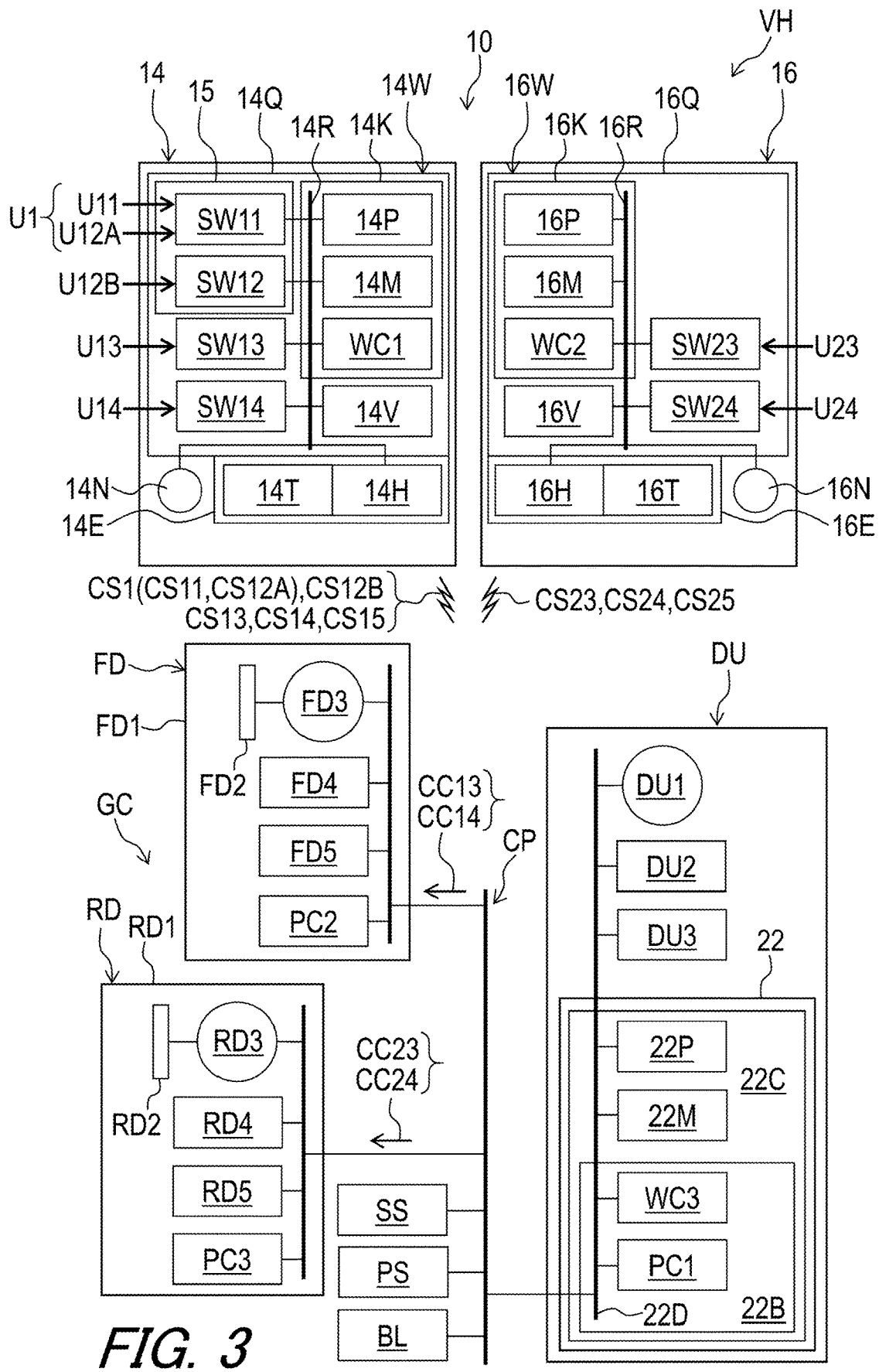
FIG. 3 is a schematic block diagram of the human-powered vehicle illustrated in FIG. 1.

As seen in FIG. 3, the human-powered vehicle VH includes an electric communication path CP. The power supply PS is electrically connected to the assist driving unit DU, the gear changing device GC, and the brake lamp BL with the electric communication path CP to supply electricity to the assist driving unit DU, the gear changing device GC, and the brake lamp BL through the electric communication path CP. For example, the electric communication path CP includes at least one electric cable and/or at least one junction.

Figure 4:
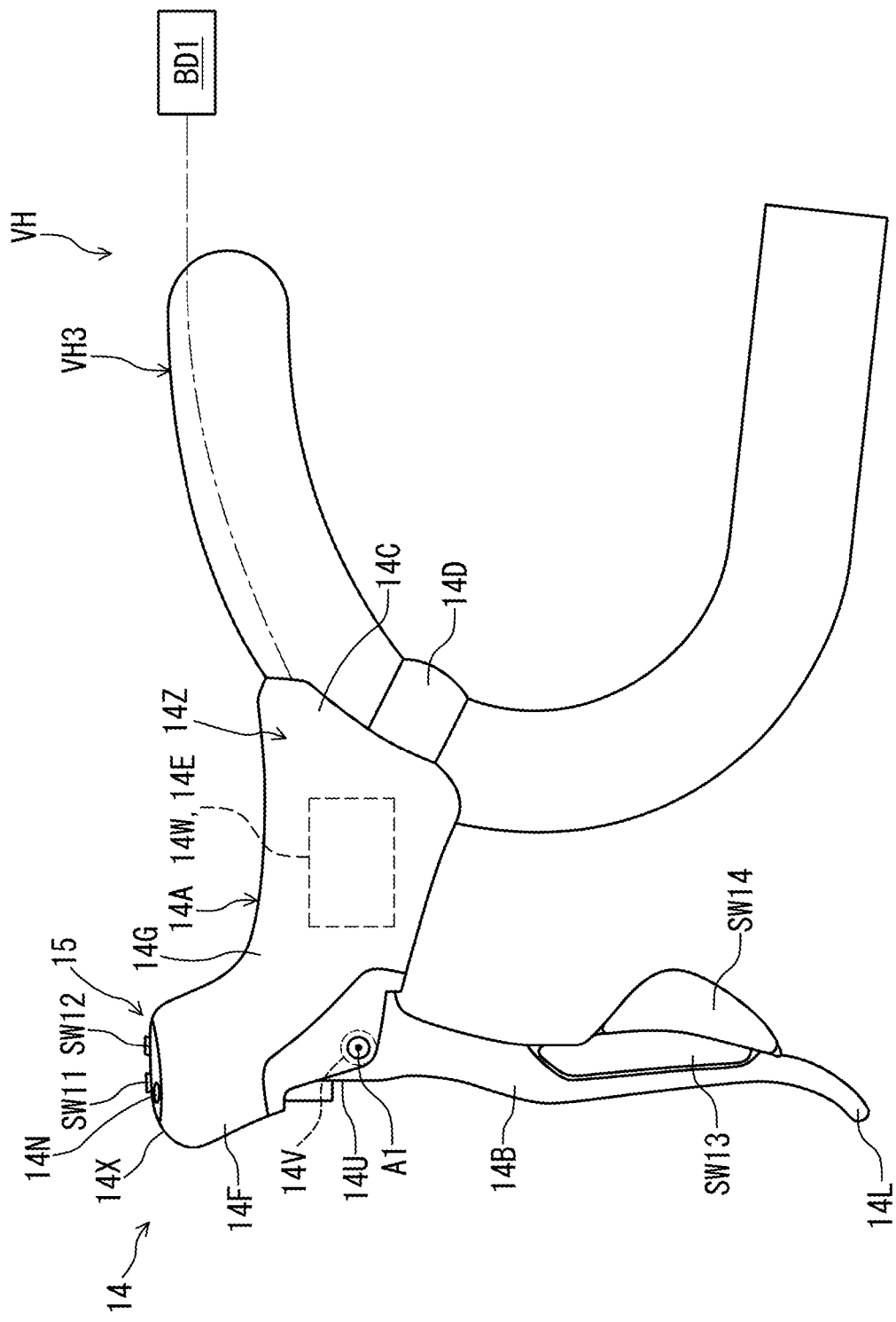
FIG. 4 is a side elevational view of an operating device of the assist driving system of the human-powered vehicle illustrated in FIG. 1.

As seen in FIG. 4, the assist driving system 10 comprises an operating device 14. The operating device 14 is configured to operate the first brake device BD1. The operating device 14 for the human-powered vehicle VH comprises a base member 14A and an operating member 14B. The base member 14A includes a coupling end 14C and a free end 14F. The coupling end 14C is configured to be coupled to the handlebar VH3. The human-powered vehicle VH includes a mounting clamp 14D configured to couple the coupling end 14C to the handlebar VH3. The mounting clamp 14D is secured to the coupling end 14C.

The free end 14F is opposite to the coupling end 14C. The operating member 14B is pivotally coupled to the base member 14A about a pivot axis A1. In this embodiment, the base member 14A includes a grip portion 14G. The grip portion 14G is provided between the coupling end 14C and the free end 14F. The grip portion 14G is configured to be gripped by a user. However, the grip portion 14G can be omitted from the base member 14A.

In this embodiment, the operating member 14B includes a lower end 14L and an upper end 14U that is closer to the base member 14A than the lower end 14L. The lower end 14L is positioned below the upper end 14U while the operating device 14 is mounted to the handlebar VH3. However, the structure of the operating member 14B is not limited to this embodiment.

As seen in FIG. 3, the operating device 14 for the human-powered vehicle VH comprises an assist operating interface 15. The assist operating interface 15 is configured to receive a user input U1. In this embodiment, the user input U1 includes a first user input U11 and a second user input U12A. The assist operating interface 15 is configured to receive the first user input U11. The assist operating interface 15 is configured to receive the second user input U12A. The assist operating interface 15 is configured to receive an additional user input U12B different from the user input U1.

In this embodiment, the assist operating interface 15 of the operating device 14 includes an electrical switch SW11. The assist operating interface 15 includes an additional electrical switch SW12. The electrical switch SW11 is configured to receive the user input U1. The electrical switch SW11 is configured to receive each of the first user input U11 and the second user input U12A. The additional electrical switch SW12 is configured to receive the additional user input U12B.

Each of the electrical switch SW11 and the additional electrical switch SW12 includes a normally open switch. Examples of the electrical switch SW11 and the additional electrical switch SW12 includes a push-button switch and a lever switch. However, the structure of the assist operating interface 15 is not limited to this embodiment. The assist operating interface 15 can include another structure such as a touch panel instead of or in additional to at least one of the electrical switch SW11 and the additional electrical switch SW12. The additional electrical switch SW12 can be omitted from the assist operating interface 15.

Figure 5:
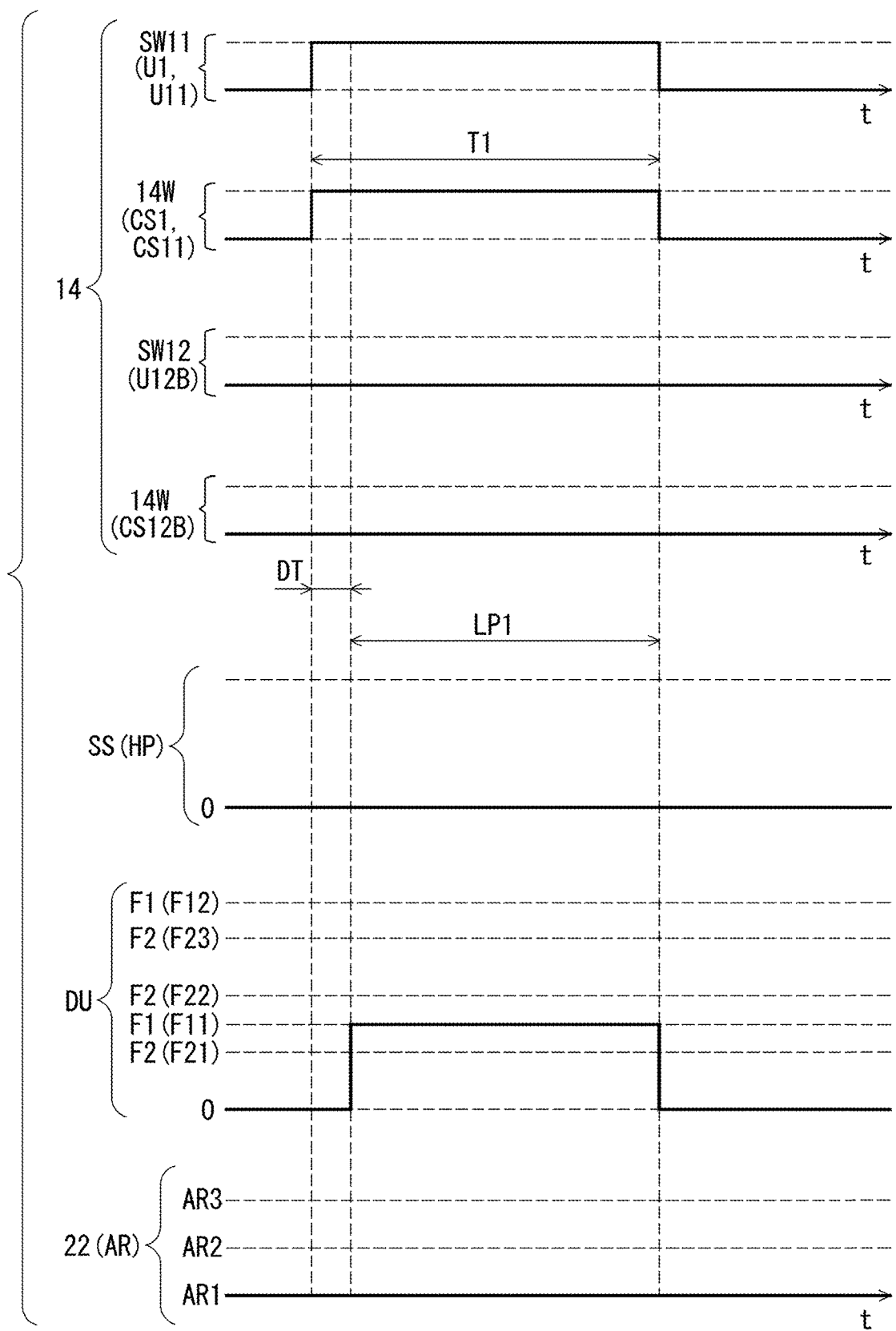
FIGS. 5 to 7 are timing charts of the assist driving system of the human-powered vehicle illustrated in FIG. 1.
Figure 6:
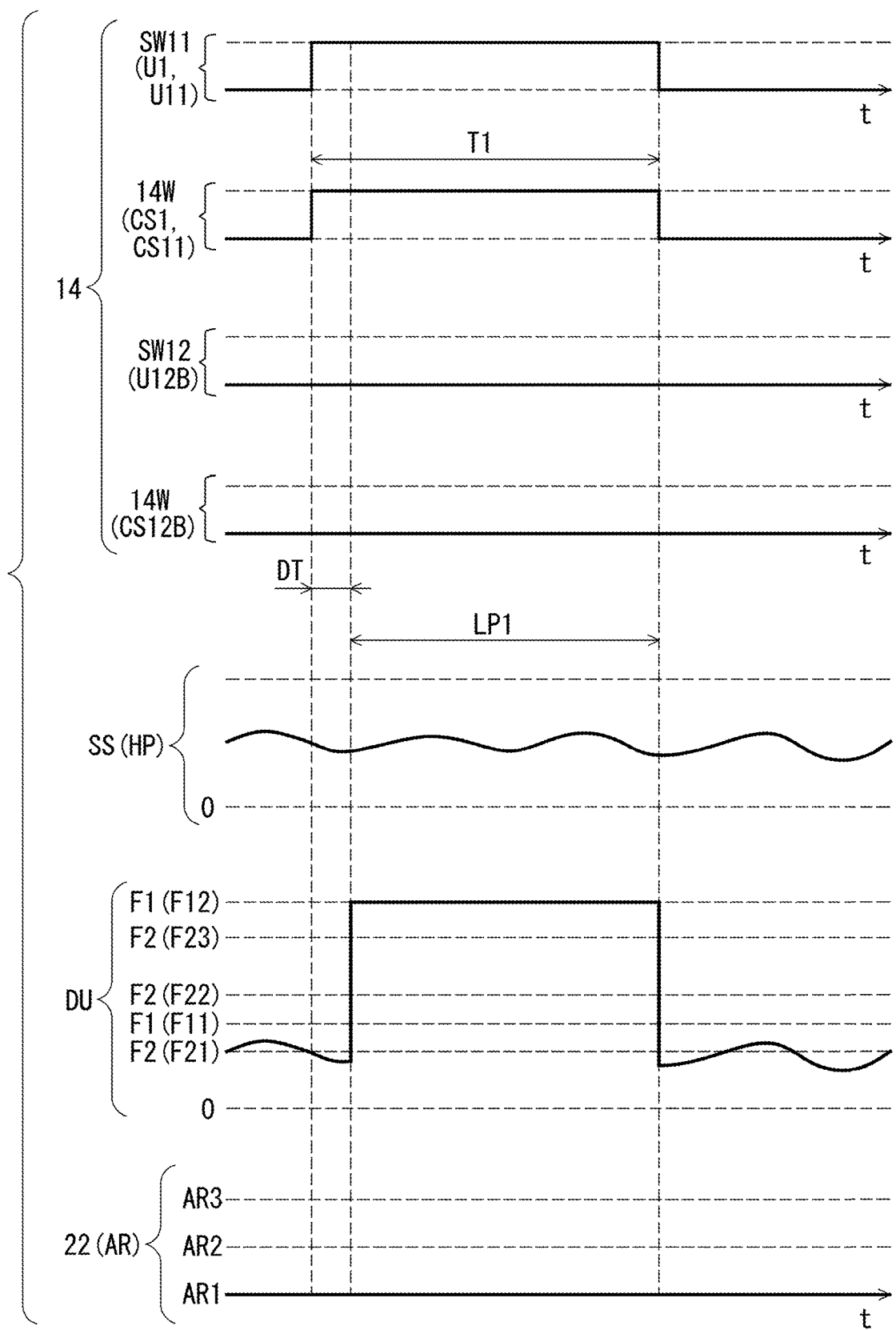
Figure 7:
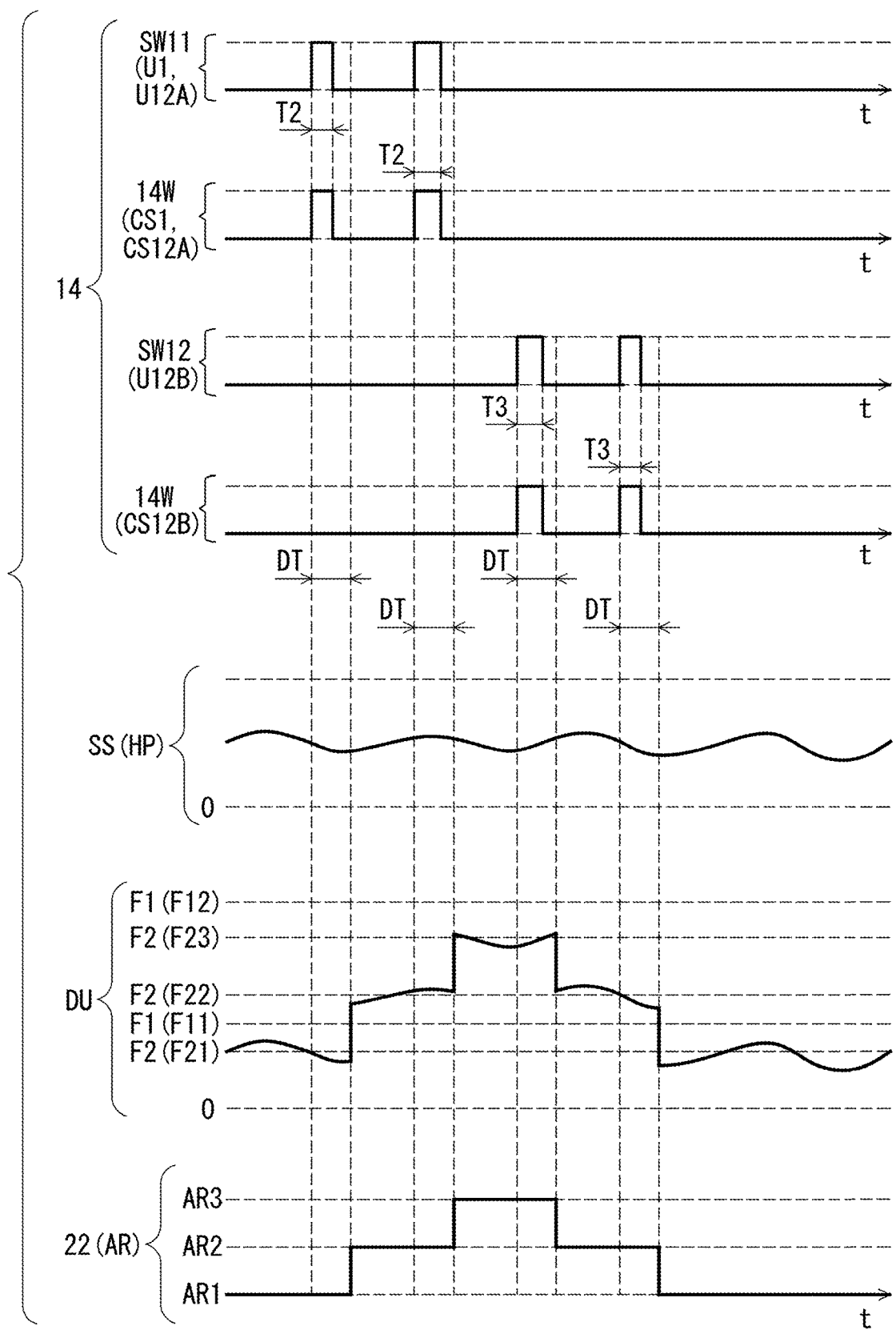

As seen in FIGS. 5 to 7, the electrical switch SW11 is configured to receive the first user input U11 with a first manner and the second user input U12A with a second manner different from the first manner. In this embodiment, the first user input U11 indicates that the assist driving unit DU generates a temporary assist driving force F1 for a limited period LP1 corresponding to an operation of the first user input U11. The second user input U12A indicates that the assist driving unit DU changes an assist ratio which is a ratio of an assist driving force F2 generated by the assist driving unit DU to the human power HP.

The first manner includes a first operate time T1 during which the electrical switch SW11 is operated. The second manner includes a second operate time T2 during which the electrical switch SW11 is operated. Thus, each of the first operate time T1 and the second operate time T2 corresponds to a time length of the user input U1 received by the electrical switch SW11. In this embodiment, the second operate time T2 is different from the first operate time T1. The first operate time T1 is longer than the second operate time T2. The first user input U11 corresponds to a long press of the electrical switch SW11. The second user input U12A corresponds to a normal press of the electrical switch SW11. The first operate time T1 is different from the limited period LP1 by a determination time DT. However, the first operate time T1 can be equal to the limited period LP1.

As seen in FIG. 7, the additional electrical switch SW12 is configured to receive an additional user input U12B. The additional user input U12B indicates that the assist driving unit DU changes the assist ratio which is the ratio of the assist driving force F2 generated by the assist driving unit DU to the human power HP. Unlike the first user input U11, the additional user input U12B corresponds to a long press and a normal press of the additional electrical switch SW12. In other words, there is no distinction between the long press and the normal press of the additional electrical switch SW12. As with the electrical switch SW11, however, the additional electrical switch SW12 can be configured to receive the additional user input U12B with a first additional manner and another additional user input with a second additional manner different from the first additional manner.

As seen in FIGS. 3 and 5, the operating device 14 further comprises a controller 14W. The controller 14W is configured to generate a control signal CS1 based on the user input U1. The control signal C1 includes a first control signal CS11 and a second control signal CS12A. The controller 14W is configured to generate, based on the first user input U11, the first control signal CS11 indicating that the assist driving unit DU generates the temporary assist driving force F1 for the limited period LP1. The controller 14W is configured to generate, based on the second user input U12A, the second control signal CS12A indicating that the assist driving unit DU changes the assist ratio. The controller 14W is configured to generate, based on the additional user input U12B, an additional control signal CS12B indicating that the assist driving unit DU changes the assist ratio.

As seen in FIGS. 5 and 6, the controller 14W is configured to generate the first control signal CS11 for the first operate time T1 during which the assist operating interface 15 receives the first user input U11. Namely, the controller 14W is configured to generate the first control signal CS11 while the electrical switch SW11 receives the first user input U11. The controller 14W is configured to stop generating the first control signal CS11 when the first user input U11 is terminated. However, the controller 14W can be configured to generate the first control signal CS11 for a predetermined period regardless of the first operate time T1 during which the assist operating interface 15 receives the first user input U11.

As seen in FIG. 7, the controller 14W is configured to generate the second control signal CS12A for the second operate time T2 during which the assist operating interface 15 receives the second user input U12A. Namely, the controller 14W is configured to generate the second control signal CS12A while the electrical switch SW11 receives the second user input U12A. The controller 14W is configured to stop generating the second control signal CS12A when the second user input U12A is terminated. However, the controller 14W can be configured to generate the second control signal CS12A for a predetermined period regardless of the second operate time T2 during which the assist operating interface 15 receives the second user input U12A.

The controller 14W is configured to generate the additional control signal CS12B for an additional period T3 during which the assist operating interface 15 receives the additional user input U12B. Namely, the controller 14W is configured to generate the additional control signal CS12B while the electrical switch SW11 receives the additional user input U12B. The controller 14W is configured to stop generating the additional control signal CS12B when the additional user input U12B is terminated. However, the controller 14W can be configured to generate the additional control signal CS12B for a predetermined period regardless of the additional period T3 during which the assist operating interface 15 receives the additional user input U12B.

As seen in FIG. 3, the operating device 14 comprises a first additional switch SW13 and a second additional switch SW14. The first additional switch SW13 is configured to receive a first additional user input U13 indicating a first control different from the first user input U11 and the second user input U12A. The second additional switch SW14 is configured to receive a second additional user input U14 indicating a second control different from the first user input U11, the second user input U12A, and the first additional user input U13.

In this embodiment, the first additional switch SW13 is configured to receive the first additional user input U13 indicating upshifting of the gear changing device GC. The second additional switch SW14 is configured to receive the second additional user input U14 indicating downshifting of the gear changing device GC. However, the first additional switch SW13 can be configured to receive the first additional user input U13 indicating control of other components. The second additional switch SW14 can be configured to receive the second additional user input U14 indicating control of other components.

Each of the first additional switch SW13 and the second additional switch SW14 includes a normally open switch. Examples of each of the first additional switch SW13 and the second additional switch SW14 includes a push-button switch and a lever switch. However, the operating device 14 can include another structure such as a touch panel instead of or in additional to at least one of the first additional switch SW13 and the second additional switch SW14.

As seen in FIG. 4, the first additional switch SW13 and the second additional switch SW14 are mounted to the operating member 14B. The base member 14A includes a pommel portion 14X provided at the free end 14F. The pommel portion 14X upwardly extends from the grip portion 14G in a state where the operating device 14 is mounted to the handlebar VH3.

Figure 8:
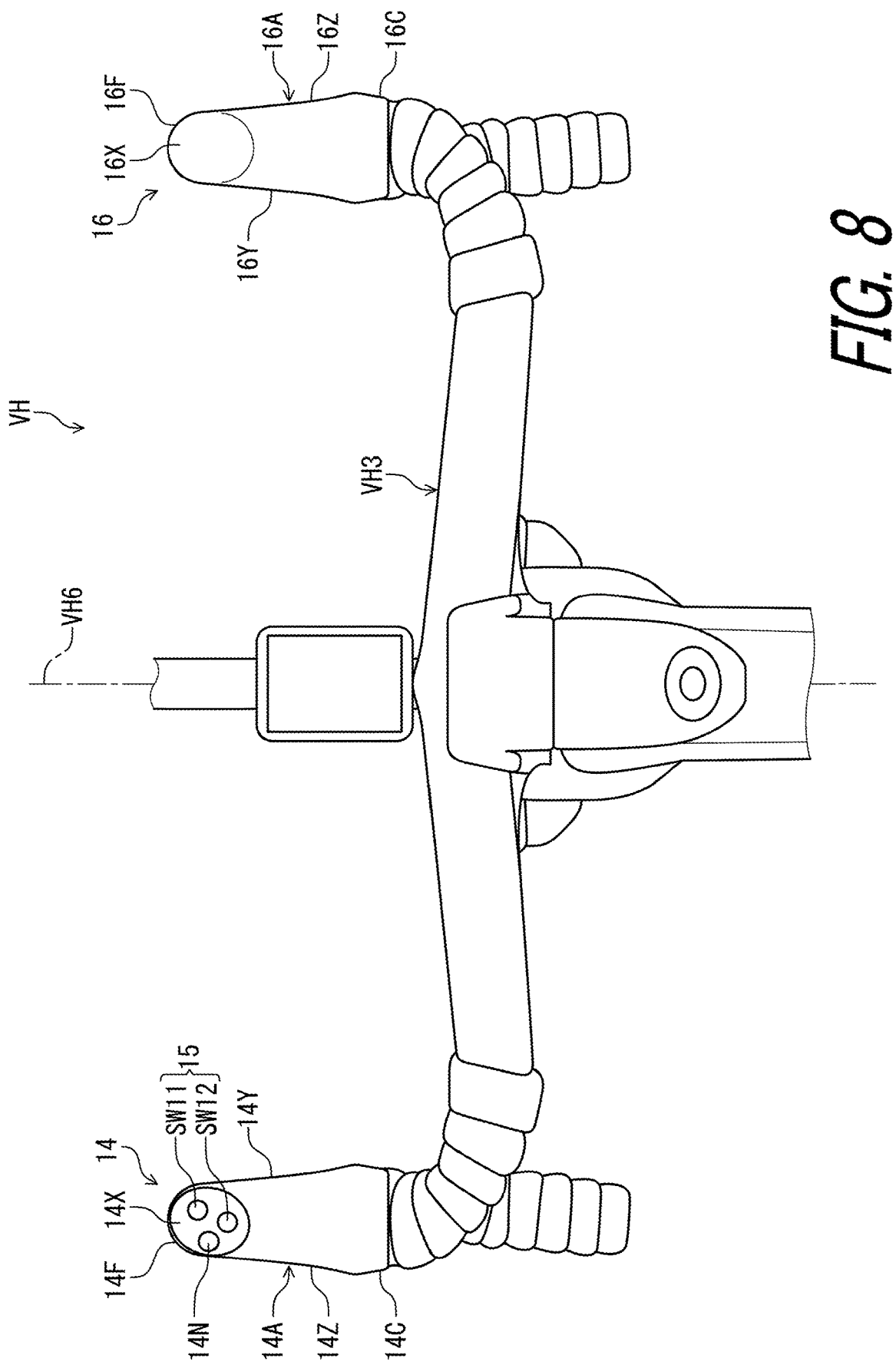
FIG. 8 is a partial plan view of the human-powered vehicle illustrated in FIG. 1.

As seen in FIG. 8, the base member 14A includes an inner lateral surface 14Y and an outer lateral surface 14Z. The inner lateral surface 14Y is provided between the outer lateral surface 14Z and the center plane VH6 of the human-powered vehicle VH. The electrical switch SW11 is mounted to at least one of the pommel portion 14X and an inner lateral surface 14Y of the base member 14A. The additional electrical switch SW12 is mounted to at least one of the pommel portion 14X and an inner lateral surface 14Y of the base member 14A. In this embodiment, the electrical switch SW11 and the additional electrical switch SW12 are mounted to the pommel portion 14X. However, at least one of the electrical switch SW11 and the additional electrical switch SW12 can be mounted to the inner lateral surface 14Y or both the pommel portion 14X and the inner lateral surface 14Y of the base member 14A. The locations of the electrical switch SW11, the additional electrical switch SW12, the first additional switch SW13, and the second additional switch SW14 are not limited to this embodiment.

As seen in FIG. 3, the controller 14W includes a communicator 14K configured to transmit a control signal. The communicator 14K is configured to be electrically connected to the assist operating interface 15. The communicator 14K is configured to be electrically connected to the electrical switch SW11 to generate and transmit the first control signal CS11 in response to the first user input U11. The communicator 14K is configured to be electrically connected to the electrical switch SW11 to generate and transmit the second control signal CS12A in response to the second user input U12A. The communicator 14K is configured to be electrically connected to the additional electrical switch SW12 to generate and transmit the additional control signal CS12B in response to the additional user input U12B.

As seen in FIG. 4, the operating device 14 includes a movement detector 14V configured to detect that the operating member 14B is operated from a rest position relative to the base member 14A. The movement detector 14V is coupled to the operating member 14B to detect the pivotal movement of the operating member 14B.

As seen in FIG. 3, the movement detector 14V is configured to be electrically connected to the communicator 14K. The communicator 14K is configured to transmit a detection signal CS15 if the movement detector 14V detects that the operating member 14B is operated from the rest position relative to the base member 14A.

The operating device 14 further comprises a wireless communicator WC1. In this embodiment, the communicator 14K includes the wireless communicator WC1. The wireless communicator WC1 is configured to wirelessly transmit the first control signal CS11. The wireless communicator WC1 is configured to wirelessly transmit the second control signal CS12A. The wireless communicator WC1 is configured to wirelessly receive information such as signals. The wireless communicator WC1 is configured to be electrically connected to the assist operating interface 15. The wireless communicator WC1 is configured to be electrically connected to the electrical switch SW11 to generate and wirelessly transmit the first control signal CS11 in response to the first user input U11. The wireless communicator WC1 is configured to be electrically connected to the electrical switch SW11 to generate and wirelessly transmit the second control signal CS12A in response to the second user input U12A. The wireless communicator WC1 is configured to be electrically connected to the additional electrical switch SW12 to generate and wirelessly transmit the additional control signal CS12B in response to the additional user input U12B. The wireless communicator WC1 is configured to be electrically connected to the first additional switch SW13 to generate and wirelessly transmit the first additional control signal CS13 in response to the first additional user input U13. The wireless communicator WC1 is configured to be electrically connected to the second additional switch SW14 to generate and wirelessly transmit the second additional control signal CS14 in response to the second additional user input U14. The wireless communicator WC1 is configured to be electrically connected to the movement detector 14V to generate and wirelessly transmit the detection signal CS15 based on the detection result of the movement detector 14V.

The communicator 14K includes a processor 14P, a memory 14M, a circuit board 14Q, and a system bus 14R. The processor 14P and the memory 14M are electrically mounted on the circuit board 14Q. The processor 14P includes a central processing unit (CPU) and a memory controller. The memory 14M is electrically connected to the processor 14P. The memory 14M includes a read only memory (ROM) and a random-access memory (RAM). The memory 14M includes storage areas each having an address in the ROM and the RAM. The processor 14P is configured to control the memory 14M to store data in the storage areas of the memory 14M and reads data from the storage areas of the memory 14M. The circuit board 14Q, the electrical switch SW11, the additional electrical switch SW12, the first additional switch SW13, and the second additional switch SW14 are electrically connected to the system bus 14R. The electrical switch SW11, the additional electrical switch SW12, the first additional switch SW13, and the second additional switch SW14 are electrically connected to the processor 14P and the memory 14M with the circuit board 14Q and the system bus 14R. The memory 14M (e.g., the ROM) stores a program. The program is read into the processor 14P, and thereby the configuration and/or algorithm of the communicator 14K is performed.

The wireless communicator WC1 is electrically mounted on the circuit board 14Q. The wireless communicator WC1 is electrically connected to the processor 14P and the memory 14M with the circuit board 14Q and the system bus 14R. The wireless communicator WC1 includes a signal transmitting circuit, a signal receiving circuit, and an antenna. Thus, the wireless communicator WC1 can also be referred to as a wireless communication circuit WC1.

The wireless communicator WC1 is configured to superimpose a digital signal such as the signals CS11, CS12A, CS12B, CS13, CS14, and CS15 on carrier wave using a predetermined wireless communication protocol to wirelessly transmit the digital signal. In this embodiment, the wireless communicator WC1 is configured to encrypt a signal such as the signals CS11, CS12A, CS12B, CS13, CS14, and CS15 using a cryptographic key to generate encrypted wireless signals.

The wireless communicator WC1 is configured to receives a wireless signal via the antenna. In this embodiment, the wireless communicator WC1 is configured to decode the wireless signal to recognize signals and/or information wirelessly transmitted from another wireless communicator. The wireless communicator WC1 is configured to decrypt the wireless signal using the cryptographic key.

As seen in FIG. 3, the operating device 14 includes an electric power source 14E. The electric power source 14E is configured to supply electricity to the communicator 14K. The electric power source 14E is configured to be electrically connected to the communicator 14K. In this embodiment, the electric power source 14E includes a battery 14T and a battery holder 14H. The battery 14T includes a replaceable and/or rechargeable battery. The battery holder 14H is configured to be electrically connected to the communicator 14K via the circuit board 14Q and the system bus 14R. The battery 14T is configured to be detachably attached to the battery holder 14H. However, the electric power source 14E is not limited to this embodiment. For example, the electric power source 14E can include another component such as a capacitor and an electricity generation element (e.g., a piezoelectric element) instead of or in addition to the battery 14T and the battery holder 14H.

As seen in FIG. 3, the operating device 14 includes a notification device 14N. The notification device 14N is configured to notify a user of information relating to the operating device 14. For example, the notification device 14N is configured to notify a user of a remaining level of the battery 14T or a communication state of the communicator 14K. The notification device 14N is configured to be electrically connected to the controller 14W. The notification device 14N includes a light emitting element. The controller 14W is configured to turn the notification device 14N on based on the information. As seen in FIG. 4, the notification device 14N is mounted to the pommel portion 14X of the base member 14A. However, the location of the notification device 14N is not limited to this embodiment.

Figure 9:
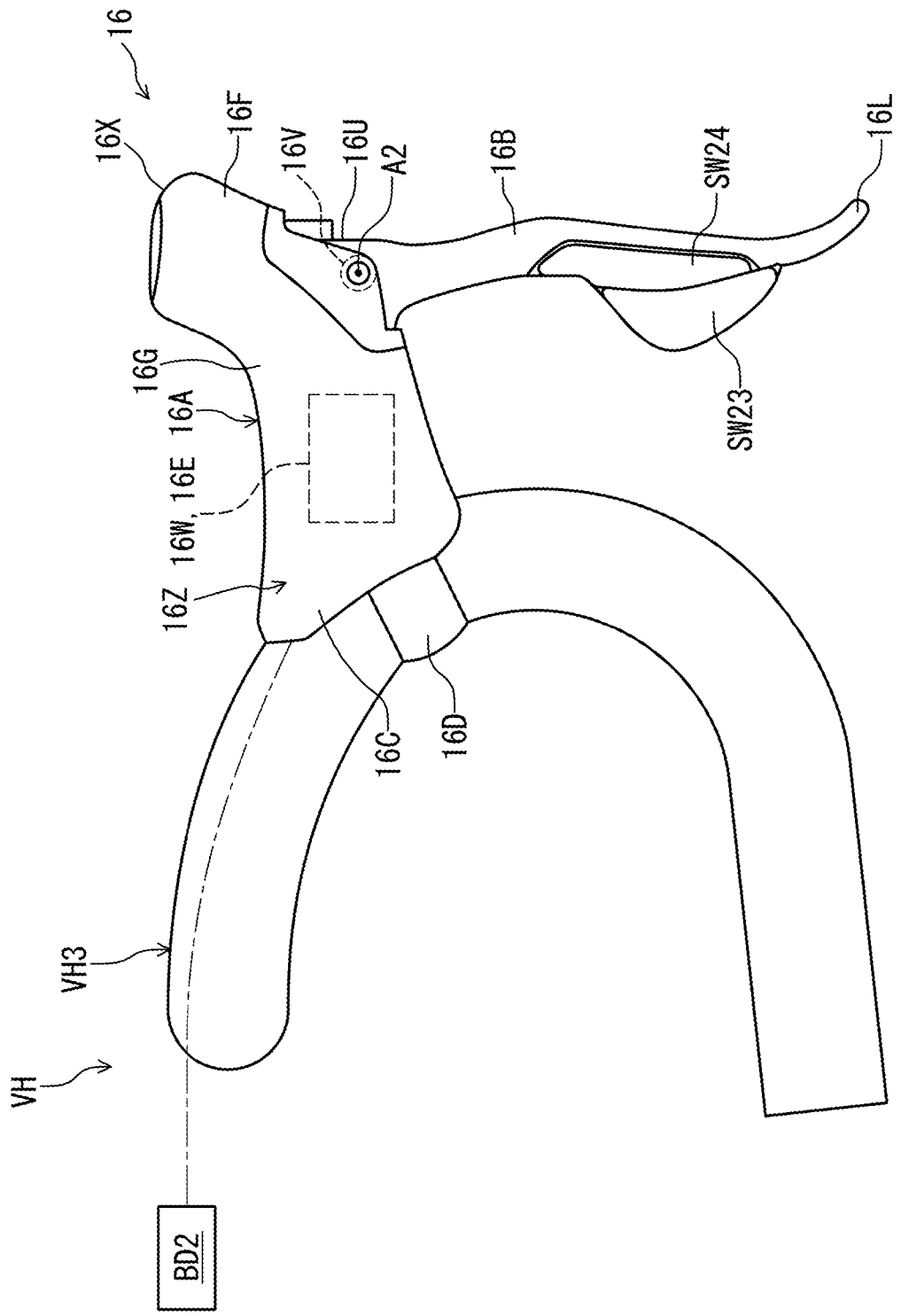
FIG. 9 is a side elevational view of another operating device of the assist driving system of the human-powered vehicle illustrated in FIG. 1.

As seen in FIGS. 3 and 9, the assist driving system 10 comprises an operating device 16. The operating device 16 is configured to operate the second brake device BD2. The operating device 16 has substantially the same structure as the structure of the operating device 14 except that the operating device 16 has a symmetrical shape with the operating device 14 with respect to the center plane VH6 (see FIG. 8). The description of the operating device 14 can be utilized as the description of the operating device 16 by replacing "14," "A1," "FD," "WC1," "SW13," "SW14," "U13," "U14," "CS13," "CS14," and "CS15" of the description with "16," "A2," "RD," "WC2," "SW23," "SW24," "U23," "U24," "CS23," "CS24," and "CS25." Thus, they will not be described in detail here for the sake of brevity. Electrical switches corresponding to the electrical switch SW11 and the additional electrical switch SW12 are omitted from the operating device 16. However, the operating device 16 can include such electrical switches.

As seen in FIG. 3, the assist driving system 10 comprises an assist controller 22. The assist controller 22 is configured to control the assist driving unit DU. The assist controller 22 is electrically connected to the speed sensor SS through the electric communication path CP. In this embodiment, the assist controller 22 is mounted to the assist driving unit DU. However, the assist controller 22 can be mounted to other components such as the gear changing unit FD, the gear changing unit RD, and the power supply PS.

The assist controller 22 includes a processor 22P, a memory 22M, a circuit board 22C, and a system bus 22D. The processor 22P and the memory 22M are electrically mounted on the circuit board 22C. The processor 22P includes a CPU and a memory controller. The memory 22M is electrically connected to the processor 22P. The memory 22M includes a ROM and a RAM. The memory 22M includes storage areas each having an address in the ROM and the RAM. The processor 22P is configured to control the memory 22M to store data in the storage areas of the memory 22M and reads data from the storage areas of the memory 22M. The memory 22M (e.g., the ROM) stores a program. The program is read into the processor 22P, and thereby the configuration and/or algorithm of the assist controller 22 is performed.

The assist controller 22 includes a communicator 22B. The communicator 22B is configured to communicate with the communicator 14K of the operating device 14. The communicator 22B is configured to communicate with the communicator 16K of the operating device 16.

In this embodiment, the assist controller 22 is configured to receive the first control signal CS11, the second control signal CS12A, the additional control signal CS12B, the first additional control signal CS13, the second additional control signal CS14, and the detection signal CS15 from the operating device 14. The assist controller 22 is configured to receive the first additional control signal CS23, the second additional control signal CS24, and the detection signal CS25 from the operating device 16.

In this embodiment, the communicator 22B includes a wireless communicator WC3 configured to wirelessly receive signals or other information from the wireless communicators WC1 and WC2. The wireless communicator WC3 is configured to wirelessly transmit signals or other information to the wireless communicators WC1 and WC2.

The wireless communicator WC3 is electrically mounted on the circuit board 22C. The wireless communicator WC3 is electrically connected to the processor 22P and the memory 22M with the circuit board 22C and the system bus 22D. The wireless communicator WC3 includes a signal transmitting circuit, a signal receiving circuit, and an antenna. Thus, the wireless communicator WC3 can also be referred to as a wireless communication circuit WC3.

The wireless communicator WC3 is configured to superimpose a digital signal on carrier wave using a predetermined wireless communication protocol to wirelessly transmit the digital signal. In this embodiment, the wireless communicator WC3 is configured to encrypt a signal using a cryptographic key to generate encrypted wireless signals.

The wireless communicator WC3 is configured to receive a wireless signal via the antenna. In this embodiment, the wireless communicator WC3 is configured to decode the wireless signal to recognize each of the signals CS11 to CS15 and CS23 to CS25 which are wirelessly transmitted from the wireless communicator WC1 and the wireless communicator WC2. The wireless communicator WC3 is configured to decrypt the wireless signal using the cryptographic key.

The assist controller 22 is configured to generate a first control command CC13 based on the first additional control signal CS13. The assist controller 22 is configured to generate a second control command CC14 based on the second additional control signal CS14. The gear changing unit FD is configured to change a gear position of the gear changing unit FD based on the first additional control signal CS13 and the second additional control signal CS14.

The assist controller 22 is configured to generate a first additional control command CC23 based on the first additional control signal CS23. The assist controller 22 is configured to generate a second additional control command CC24 based on the second additional control signal CS24. The gear changing unit RD is configured to change a gear position of the gear changing unit RD based on the first additional control signal CS23 and the second additional control signal CS24.

As seen in FIG. 3, the gear changing unit RD includes a base member RD1, a chain guide RD2, an actuator RD3, a position sensor RD4, and an actuator driver RD5. The base member RD1 is mounted to the vehicle body VH1 (see e.g., FIG. 1). The chain guide RD2 is configured to guide the chain C. The chain guide RD2 is movably coupled to the base member RD1 and is configured to engage with the chain C when shifting the chain C relative to the rear sprocket assembly RS. The actuator RD3 is configured to move the chain guide RD2 relative to the base member RD1 to shift the chain C relative to the rear sprocket assembly RS. Examples of the actuator RD3 include a direct current motor and a stepper motor.

The actuator driver RD5 is electrically connected to the actuator RD3 to control the actuator RD3 based on the first additional control command CC23 and the second additional control command CC24 generated by the assist controller 22. Examples of the actuator RD3 include a direct-current (DC) motor and a stepper motor. The actuator RD3 includes a rotational shaft operatively coupled to the chain guide RD2. The position sensor RD4 is configured to sense a current gear position of the gear changing unit RD. Examples of the position sensor RD4 include a potentiometer and a rotary encoder. The position sensor RD4 is configured to sense an absolute rotational position of the rotational shaft of the actuator RD3 as the current gear position of the gear changing unit RD. The actuator RD3 and the position sensor RD4 are electrically connected to the actuator driver RD5.

The actuator driver RD5 is configured to control the actuator RD3 to move the chain guide RD2 relative to the base member RD1 by one gear position in a downshift direction based on the first additional control command CC23 and the current gear position sensed by the position sensor RD4. The actuator driver RD5 is configured to control the actuator RD3 to move the chain guide RD2 relative to the base member RD1 by one gear position in an upshift direction based on the second additional control command CC24 and the current gear position sensed by the position sensor RD4.

As seen in FIG. 3, the gear changing unit FD includes a base member FD1, a chain guide FD2, an actuator FD3, a position sensor FD4, and an actuator driver FD5. The base member FD1 is mounted to the vehicle body VH1 (see e.g., FIG. 1). The chain guide FD2 is configured to guide the chain C. The chain guide FD2 is movably coupled to the base member FD1 and is configured to contact the chain C when shifting the chain C relative to the front sprocket assembly FS. The actuator FD3 is configured to move the chain guide FD2 relative to the base member FD1 to shift the chain C relative to the front sprocket assembly FS. Examples of the actuator FD3 include a direct current motor and a stepper motor.

The actuator driver FD5 is electrically connected to the actuator FD3 to control the actuator FD3 based on the first control command CC13 and the second control command CC14 generated by the assist controller 22. Examples of the actuator FD3 include a direct-current (DC) motor and a stepper motor. The actuator FD3 includes a rotational shaft operatively coupled to the chain guide FD2. The position sensor FD4 is configured to sense a current gear position of the gear changing unit FD. Examples of the position sensor FD4 include a potentiometer and a rotary encoder. The position sensor FD4 is configured to sense an absolute rotational position of the rotational shaft of the actuator FD3 as the current gear position of the gear changing unit FD. The actuator FD3 and the position sensor FD4 are electrically connected to the actuator driver FD5.

The actuator driver FD5 is configured to control the actuator FD3 to move the chain guide FD2 relative to the base member FD1 by one gear position in a downshift direction based on the first control command CC13 and the current gear position sensed by the position sensor FD4. The actuator driver FD5 is configured to control the actuator FD3 to move the chain guide FD2 relative to the base member FD1 by one gear position in an upshift direction based on the second control command CC14 and the current gear position sensed by the position sensor FD4.

As seen in FIG. 3, the assist controller 22, the assist driving unit DU, the gear changing unit FD, and the gear changing unit RD communicate with each other via the electric communication path CP using power line communication (PLC) technology. More specifically, each of the electric cables of the electric communication path CP includes a ground line and a voltage line that are detachably connected to a serial bus that is formed by communication interfaces and the junction. In this embodiment, the assist controller 22, the gear changing unit RD, the gear changing unit FD, and the assist driving unit DU can all communicate with each other through the voltage line using the PLC technology.

The control commands CC13 and CC14 are transmitted from the assist controller 22 to the gear changing unit FD through the electric communication path CP. The control commands CC11, CC12, CC21, and CC22 are transmitted from the assist controller 22 to the assist driving unit DU through the electric communication path CP. However, the gear changing unit FD can include a wireless communicator configured to wirelessly receive the first additional control signal CS13 and the second additional control signal CS14 from the assist driving system 10. The assist driving unit DU can include a wireless communicator configured to wirelessly receive the control commands CC11, CC12, CC21, and CC22 from the assist driving system 10. In such embodiment, the electric communication path CP can be omitted from the human-powered vehicle VH. The assist driving unit DU can use the power supply PS, and each of the gear changing unit FD and the gear changing unit RD can include another power supply.

The PLC technology is used for communicating between electric components. The PLC carries data on a conductor that is also used simultaneously for electric power transmission or electric power distribution to the electric components. In this embodiment, electricity is supplied from the power supply PS to the gear changing unit FD, the gear changing unit RD, and the assist driving unit DU via the electric communication path CP. Furthermore, the assist controller 22 can receive information signals from the gear changing unit RD, the gear changing unit FD, the assist driving unit DU, and the power supply PS through the electric communication path CP using the PLC.

The PLC uses unique identifying information such as a unique identifier that is assigned to each of the assist driving unit DU, the gear changing unit FD, the gear changing unit RD, and the power supply PS. Each of the electric components DU, FD, RD, and PS includes a memory in which the unique identifying information is stored. Based on the unique identifying information, each of the electric components DU, FD, RD, and PS is configured to recognize, based on the unique identifying information, information signals which are necessary for itself among information signals transmitted via the electric communication path CP. For example, the assist controller 22 is configured to recognize information signals transmitted from the assist driving unit DU, the gear changing unit FD, the gear changing unit RD, and the power supply PS with the electric communication path CP. Instead of using the PLC technology, however, separate signal wires can be provided for transmitting data in addition to the ground wire and the voltage wire if needed and/or desired.

The communicator 22B includes a PLC controller PC1. The PLC controller PC1 is connected to the electric communication path CP, the gear changing unit RD, and the system bus 22D. The PLC controller PC is configured to separate input signals to a power source voltage and control signals. The PLC controller PC1 is configured to regulate the power source voltage to a level at which the assist controller 22 and the gear changing unit RD can properly operate. The PLC controller PC1 is further configured to superimpose output signals such as the second control command CC21 and the second additional control command CC22 on the power source voltage applied to the electric communication path CP from the power supply PS. The memory 22M is configured to store the unique identifying information of the assist controller 22 and the gear changing unit RD.

The gear changing unit FD includes a PLC controller PC2. The assist driving unit DU includes a PLC controller PC3. The PLC controllers PC2 and PC3 have substantially the same structure as the structure of the PLC controller PC1. Thus, they will not be described in detail for the sake of brevity.

The assist controller 22 is configured to control the brake lamp BL. The assist controller 22 is configured to turn the brake lamp BL on while the assist controller 22 receives the detection signal CS15 and/or the detection signal CS25. The assist controller 22 is configured to turn the brake lamp BL off while the assist controller 22 does not receive both the detection signal CS15 and the detection signal CS25.

As seen in FIGS. 5 to 7, the assist controller 22 is configured to control the assist driving unit DU based on the first user input U11. The assist controller 22 is configured to control the assist driving unit DU based on the first user input U11 and the second user input U12A. The assist controller 22 is configured to control the assist driving unit DU based on the first user input U11, the second user input U12A, and the additional user input U12B.

As seen in FIG. 7, the assist controller 22 is configured to select one assist ratio of a plurality of assist ratios based on the second user input U12A. The assist controller 22 is configured to select one assist ratio of a plurality of assist ratios based on the second control signal CS12A. The assist controller 22 is configured to select one assist ratio of a plurality of assist ratios based on the additional user input U12B. The assist controller 22 is configured to select one assist ratio of a plurality of assist ratios based on the additional control signal CS12B.

In this embodiment, the assist driving unit DU has a plurality of assist ratios AR. The plurality of assist ratios AR includes a first assist ratio AR1, a second assist ratio AR2, and a third assist ratio AR3. The first assist ratio AR1 is lower than the second assist ratio AR2 and the third assist ratio AR3. The third assist ratio AR3 is higher than the first assist ratio AR1 and the second assist ratio AR2. The assist controller 22 is configured to store the plurality of assist ratios AR and the selected assist ratio in the memory 22M.

The assist controller 22 is configured to select one assist ratio of the plurality of assist ratios AR based on the second control signal CS12A and the additional control signal CS12B. In this embodiment, the assist controller 22 is configured to select one assist ratio of the plurality of assist ratios AR to increase the assist ratio based on the second control signal CS12A. The assist controller 22 is configured to select one assist ratio of the plurality of assist ratios AR to decrease the assist ratio based on the additional control signal CS12B. The assist controller 22 is configured to select the second assist ratio AR2 in response to the second control signal CS12A when the current assist ratio is the first assist ratio AR1. The assist controller 22 is configured to select the third assist ratio AR3 in response to the second control signal CS12A when the current assist ratio is the second assist ratio AR2. The assist controller 22 is configured to select the third assist ratio AR3 in response to the second control signal CS12A when the current assist ratio is the third assist ratio AR3. The assist controller 22 is configured to select the second assist ratio AR2 in response to the additional control signal CS12B when the current assist ratio is the third assist ratio AR3. The assist controller 22 is configured to select the first assist ratio AR1 in response to the additional control signal CS12B when the current assist ratio is the second assist ratio AR2. The assist controller 22 is configured to select the first assist ratio AR1 in response to the additional control signal CS12B when the current assist ratio is the first assist ratio AR1.

The assist controller 22 is configured to control the assist driving unit DU to generate the assist driving force F2 based on an assist ratio selected by the assist controller 22. The assist controller 22 is configured to control the assist driving unit DU to generate the assist driving force F2 based on the assist ratio selected by the assist controller 22 while the assist controller 22 does not receive the first control signal CS11.

The assist controller 22 is configured to control the assist driving unit DU to generate the assist driving force F21 based on the first assist ratio AR1 and the human power HP while the assist controller 22 does not receive the first control signal CS11. The assist controller 22 is configured to control the assist driving unit DU to generate the assist driving force F22 based on the second assist ratio AR2 and the human power HP while the assist controller 22 does not receive the first control signal CS11. The assist controller 22 is configured to control the assist driving unit DU to generate the assist driving force F23 based on the third assist ratio AR3 and the human power HP while the assist controller 22 does not receive the first control signal CS11.

As seen in FIGS. 5 and 6, the assist controller 22 is configured to determine whether an operate time of the user input U1 received by the electrical switch SW11 is equal to or shorter than a determination time DT. The assist controller 22 is configured to measure a period from receipt of the control signal CS1 transmitted from the operating device 14. The assist controller 22 is configured to conclude that the user input U1 is the first user input U11 if the measured period from the receipt of the control signal CS1 exceeds the determination time DT. As seen in FIG. 7, the assist controller 22 is configured to conclude that the user input U1 is the second user input U12A if the measured period from the receipt of the control signal CS1 does not exceed the determination time DT.

As seen in FIGS. 5 and 6, the assist controller 22 is configured to control the assist driving unit DU to generate the temporary assist driving force F1 in response to the first user input U11. The assist controller 22 is configured to control the assist driving unit DU to generate the temporary assist driving force F1 in response to the first control signal CS11. The assist controller 22 is configured to control the assist driving unit DU to keep generating the temporary assist driving force F1 while the assist controller 22 receives the first control signal CS11. In this embodiment, the assist controller 22 is configured to control the assist driving unit DU to generate the temporary assist driving force F1 in response to the first control signal CS11 regardless of the selected assist ratio. The assist controller 22 is configured to control the assist driving unit DU to generate the temporary assist driving force F1 if the measured period from the receipt of the control signal CS1 exceeds the determination time DT.

In this embodiment, the assist controller 22 is configured to control the assist driving unit DU to generate the temporary assist driving force F11 if the measured period from the receipt of the control signal CS1 exceeds the determination time DT, if the human power HP is zero, and if the rotational speed sensed by the speed sensor SS is lower than a predetermined rotational speed. The predetermined rotational speed is stored in the memory 22M.

As seen in FIG. 5, the assist controller 22 is configured to control the assist driving unit DU to start to generate the temporary assist driving force F11 if the measured period from the receipt of the control signal CS1 exceeds the determination time DT, if the human power HP is zero, and if the rotational speed sensed by the speed sensor SS is lower than the predetermined rotational speed. The assist controller 22 is configured to control the assist driving unit DU to stop generating the temporary assist driving force F11 if the control signal CS1 (e.g., the first control signal CS11) is terminated. For example, the user presses the electrical switch SW11 to move the human-powered vehicle VH forward using the temporary assist driving force F11 while the user walks the human-powered vehicle VH without pedaling. This can be referred to as a walk mode.

As seen in FIG. 6, the assist controller 22 is configured to control the assist driving unit DU to generate the temporary assist driving force F12 if the measured period from the receipt of the control signal CS1 exceeds the determination time DT and if the human power HP is larger than zero. The temporary assist driving force F12 is larger than the temporary assist driving force F11. The assist controller 22 is configured to control the assist driving unit DU to start to generate the temporary assist driving force F12 if the measured period from the receipt of the control signal CS12 exceeds the determination time DT and if the human power HP is larger than zero. The assist controller 22 is configured to control the assist driving unit DU to stop generating the temporary assist driving force F12 if the control signal CS1 (e.g., the first control signal CS11) is terminated. For example, the temporary assist driving force F12 is a maximum force that the assist driving unit DU can generate. Thus, the user utilizes the temporary assist driving force F12 to temporarily increase the speed of the human-powered vehicle VH by pressing and holding the electrical switch SW11. This can be referred to as a boost mode.

In this embodiment, the assist controller 22 is configured to calculate the temporary assist driving force F1 based on a value stored in the memory 22M. For example, the assist controller 22 is configured to calculate the temporary assist driving force F11 based walk-mode information stored in the memory 22M. The walk-mode information includes a torque and a rotational speed for the walk mode. The assist controller 22 is configured to calculate the temporary assist driving force F11 so that the rotational speed sensed by the speed sensor SS is lower than a walk-mode rotational speed stored in the memory 22M. For example, the walk-mode rotational speed ranges from three km/h to five km/h. The assist controller 22 is configured to calculate the temporary assist driving force F12 based on a maximum torque and a maximum rotational speed which are stored in the memory 22M.

As seen in FIG. 6, the assist controller 22 is configured to control the assist driving unit DU to change a driving force generated by the assist driving unit DU from the assist driving force F2 generated based on the assist ratio to the temporary assist driving force F12 if the measured period from the receipt of the control signal CS1 exceeds the determination time DT and if the human power HP is larger than zero. The assist controller 22 is configured to control the assist driving unit DU to change a driving force generated by the assist driving unit DU from the temporary assist driving force F12 to the assist driving force F2 generated based on the assist ratio one of after a termination of the first control signal CS11 and after a predetermined period elapses from the termination of the first control signal CS11.

In this embodiment, the assist controller 22 is configured to control the assist driving unit DU to change a driving force generated by the assist driving unit DU from the temporary assist driving force F12 to the assist driving force F2 generated based on the assist ratio after the termination of the first control signal CS11. However, the assist controller 22 can be configured to control the assist driving unit DU to change a driving force generated by the assist driving unit DU from the temporary assist driving force F1 to the assist driving force F2 generated based on the assist ratio after the predetermined period elapses from the termination of the first control signal CS11.

Second Embodiment

An assist driving system 210 in accordance with a second embodiment will be described below referring to FIGS. 10 to 13. The assist driving system 210 has the same structure and/or configuration as those of the assist driving system 10 except for the assist operating interface 15. Thus, elements having substantially the same function as those in the first embodiment will be numbered the same here and will not be described and/or illustrated again in detail here for the sake of brevity.

Figure 10:
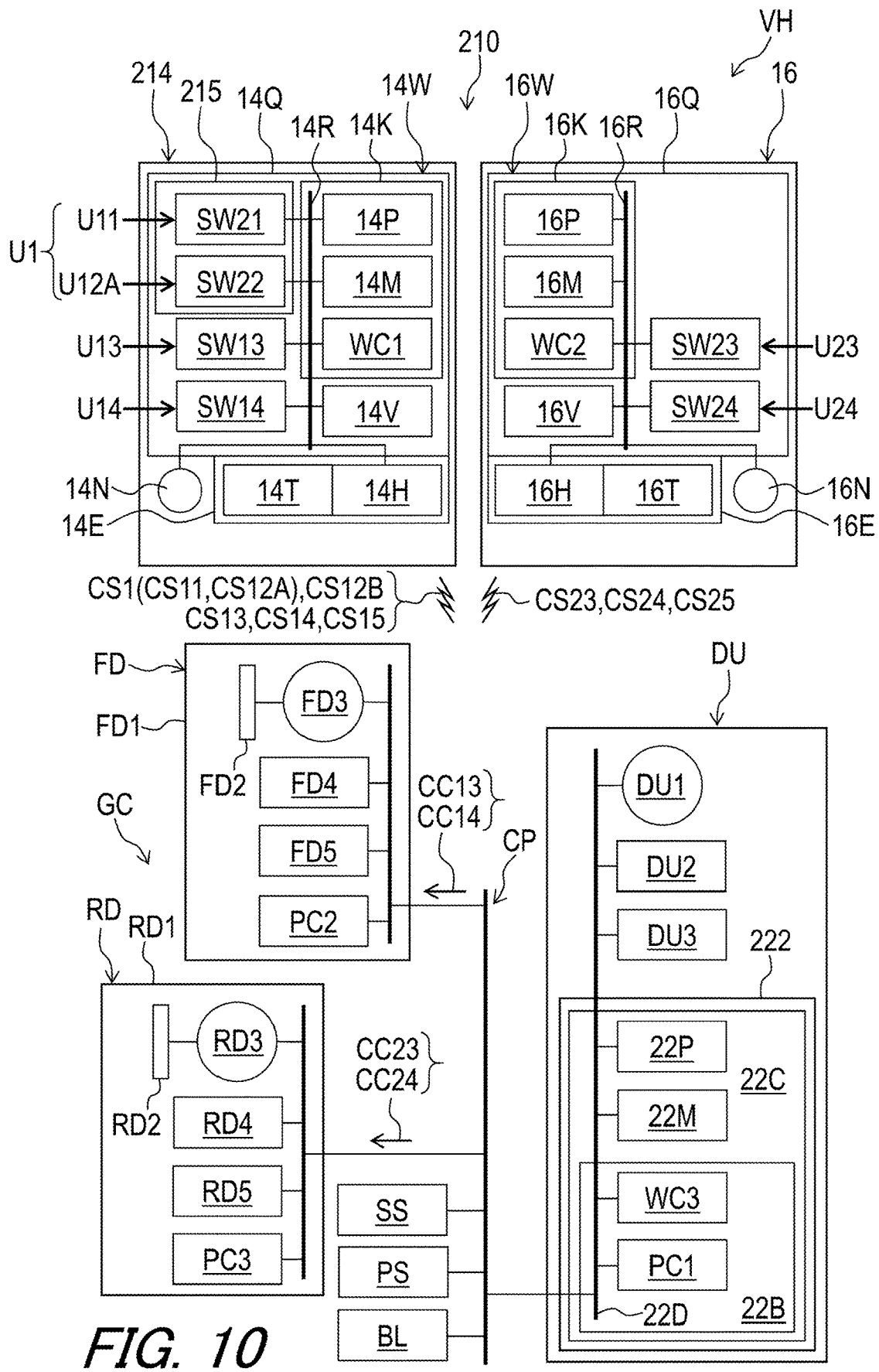
FIG. 10 is a schematic block diagram of a human-powered vehicle including an assist driving system in accordance with a second embodiment.

As seen in FIG. 10, the assist driving system 210 comprises an operating device 214, the assist driving unit DU, and an assist controller 222. The operating device 214 has substantially the same structure as the structure of the operating device 14 of the first embodiment. The operating device 214 for the human-powered vehicle VH comprises the base member 14A, the operating member 14B, and an assist operating interface 215. The assist operating interface 215 is configured to receive the first user input U11. The assist operating interface 215 is configured to receive the second user input U12A. The assist operating interface 215 is configured to receive the first user input U11 indicating that the assist driving unit DU generates the temporary assist driving force F1 for the limited period LP1 corresponding to an operation of the first user input U11.

In the first embodiment, the electrical switch SW11 is configured to receive the first user input U11 and the second user input U12A. In this embodiment, the assist operating interface 215 includes a first electrical switch SW21 and a second electrical switch SW22. The first electrical switch SW21 is configured to receive the first user input U11. The second electrical switch SW22 is configured to receive the second user input U12A. The first electrical switch SW21 and the second electrical switch SW22 have substantially the same structures as the structures of the electrical switch SW11 and the additional electrical switch SW12 of the first embodiment.

Figure 11:
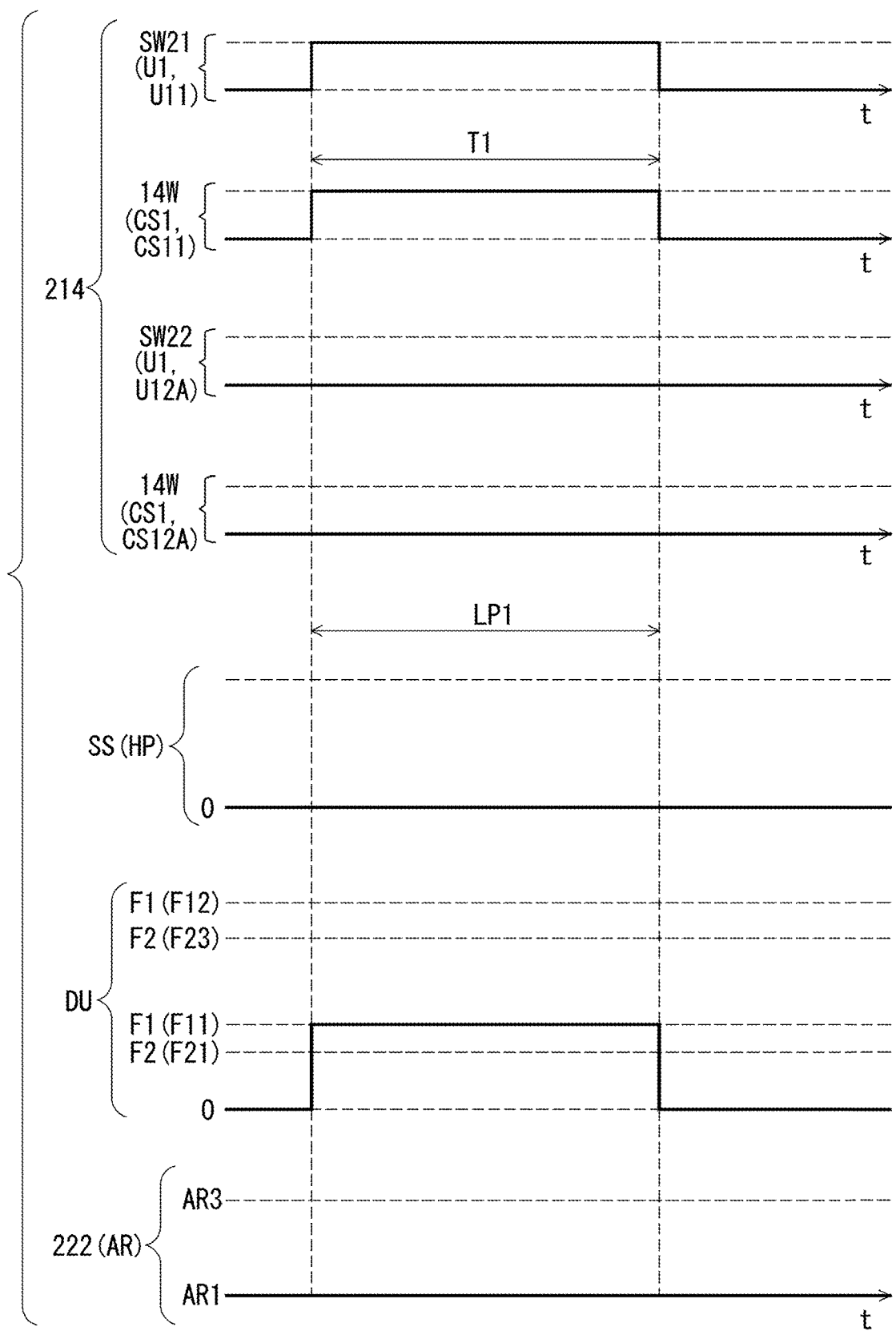
FIGS. 11 to 13 are timing charts of the assist driving system of the human-powered vehicle illustrated in FIG. 10.
Figure 12:
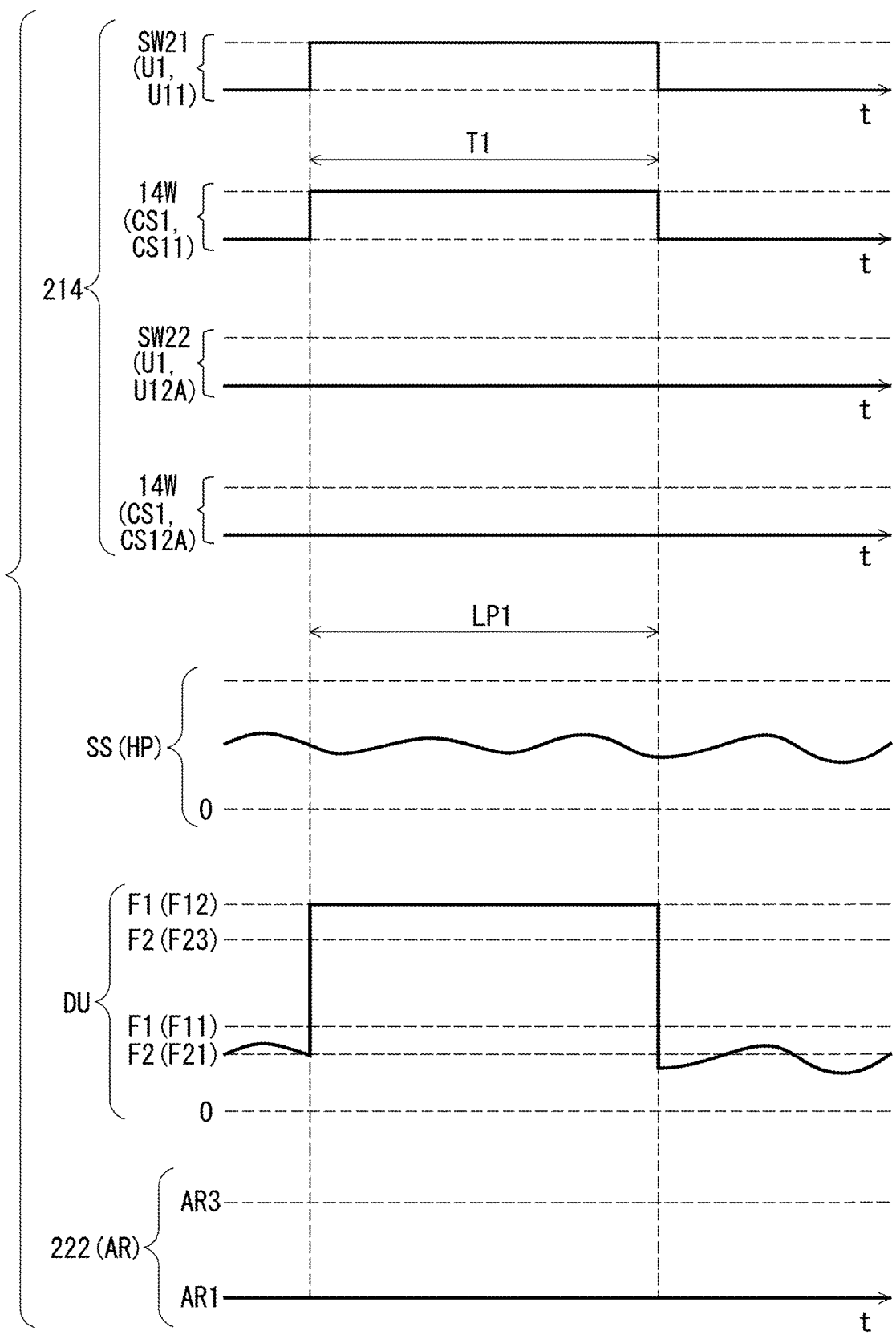
Figure 13:
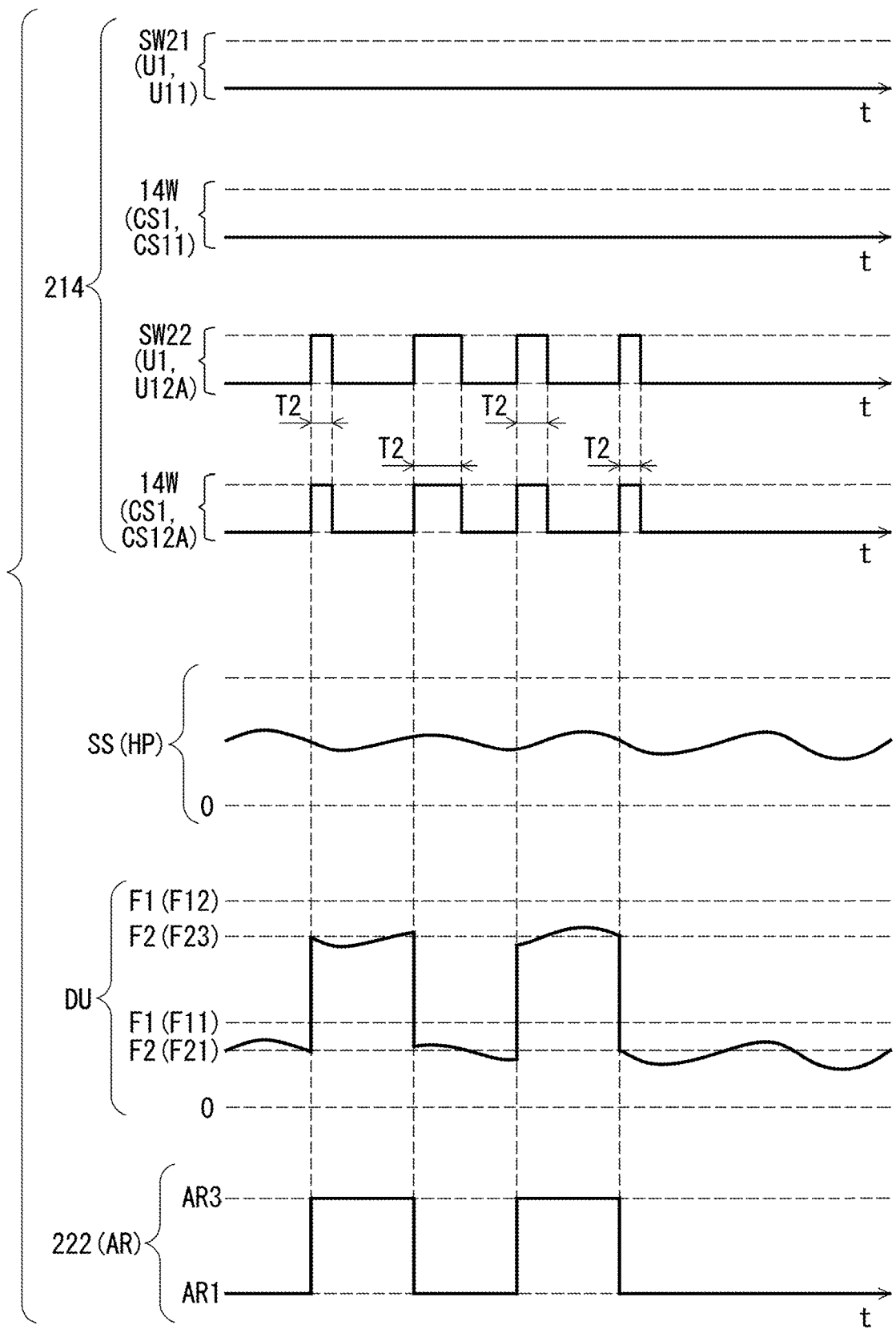

As seen in FIGS. 11 to 13, the controller 14W is configured to generate, based on the first user input U11, the first control signal CS11 indicating that the assist driving unit DU generates the temporary assist driving force F1 for the limited period LP1. The controller 14W is configured to generate, based on the second user input U12A, the second control signal CS12A indicating that the assist driving unit DU changes the assist ratio.

As seen in FIGS. 11 and 12, the controller 14W is configured to generate the first control signal CS11 for the first operate time T1 during which the assist operating interface 215 receives the first user input U11. However, the controller 14W can be configured to generate the first control signal CS11 for a predetermined period regardless of the first operate time T1 during which the assist operating interface 215 receives the first user input U11.

In this embodiment, the assist controller 222 is configured to identify the first control signal CS regardless of a signal length of the first control signal CS11. Thus, the assist controller 222 is configured not to determine whether the first operate time T1 of the user input U1 received by the electrical switch SW11 is equal to or shorter than the determination time DT.

The assist controller 222 is configured to control the assist driving unit DU to generate the temporary assist driving force F1 in response to the first user input U11. The assist controller 222 is configured to control the assist driving unit DU to generate the temporary assist driving force F1 in response to the first control signal CS11.

The assist controller 222 is configured to control the assist driving unit DU to generate the temporary assist driving force F11 for the limited period LP1 in response to the first control signal CS11 if the human power HP is zero and if the rotational speed sensed by the speed sensor SS is lower than the predetermined rotational speed. The assist controller 222 is configured to control the assist driving unit DU to start to generate the temporary assist driving force F11 in response to the first control signal CS11 if the human power HP is zero and if the rotational speed sensed by the speed sensor SS is lower than the predetermined rotational speed. The assist controller 222 is configured to control the assist driving unit DU to stop generating the temporary assist driving force F11 if the first control signal CS11 is terminated.

The assist controller 222 is configured to control the assist driving unit DU to generate the temporary assist driving force F12 for the limited period LP1 in response to the first control signal CS11 if the human power HP is larger than zero. The assist controller 222 is configured to control the assist driving unit DU to start to generate the temporary assist driving force F12 in response to the first control signal CS11 if the human power HP is larger than zero. The assist controller 222 is configured to control the assist driving unit DU to stop generating the temporary assist driving force F12 if the first control signal CS11 is terminated.

As seen in FIG. 13, the controller 14W is configured to generate the second control signal CS12A for the second operate time T2 during which the assist operating interface 215 receives the second user input U12A. However, the controller 14W can be configured to generate the second control signal CS12A for a predetermined period regardless of the second operate time T2 during which the assist operating interface 215 receives the second user input U12A.

The second control signal CS12A is distinguishable from the first control signal CS11 as a digital signal. In this embodiment, the first control signal CS11 includes identification information indicating the first user input U11. The second control signal CS12A includes identification information indicating the second user input U12A. The assist controller 222 is configured to identify each of the first control signal CS11 and the second user input U12A regardless of signal lengths of the first control signal CS11 and the second control signal CS12A.

As seen in FIG. 10, the assist controller 222 has substantially the same structure as the structure of the assist controller 222 of the first embodiment. As seen in FIG. 13, in this embodiment, the plurality of assist ratios AR includes the first assist ratio AR1 and the third assist ratio AR3. The second assist ratio AR2 is omitted from the plurality of assist ratios AR. The assist controller 222 is configured to select the third assist ratio AR3 in response to the second control signal CS12A when the current assist ratio is the first assist ratio AR1. The assist controller 222 is configured to select the first assist ratio AR1 in response to the second control signal CS12A when the current assist ratio is the third assist ratio AR3.

The assist controller 222 is configured to control the assist driving unit DU to generate the assist driving force F2 based on an assist ratio selected by the assist controller 222. The assist controller 222 is configured to control the assist driving unit DU to generate the assist driving force F2 based on the assist ratio selected by the assist controller 222 while the assist controller 222 does not receive the first control signal CS11.

The assist controller 222 is configured to control the assist driving unit DU to generate the assist driving force F21 based on the first assist ratio AR1 and the human power HP while the assist controller 222 does not receive the first control signal CS11. The assist controller 222 is configured to control the assist driving unit DU to generate the assist driving force F23 based on the third assist ratio AR3 and the human power HP while the assist controller 222 does not receive the first control signal CS11.

Third Embodiment

An assist driving system 310 in accordance with a third embodiment will be described below referring to FIGS. 14 to 17. The assist driving system 310 has the same structure and/or configuration as those of the assist driving system 210 except for the operating device 214. Thus, elements having substantially the same function as those in the first embodiment will be numbered the same here and will not be described and/or illustrated again in detail here for the sake of brevity.

Figure 14:
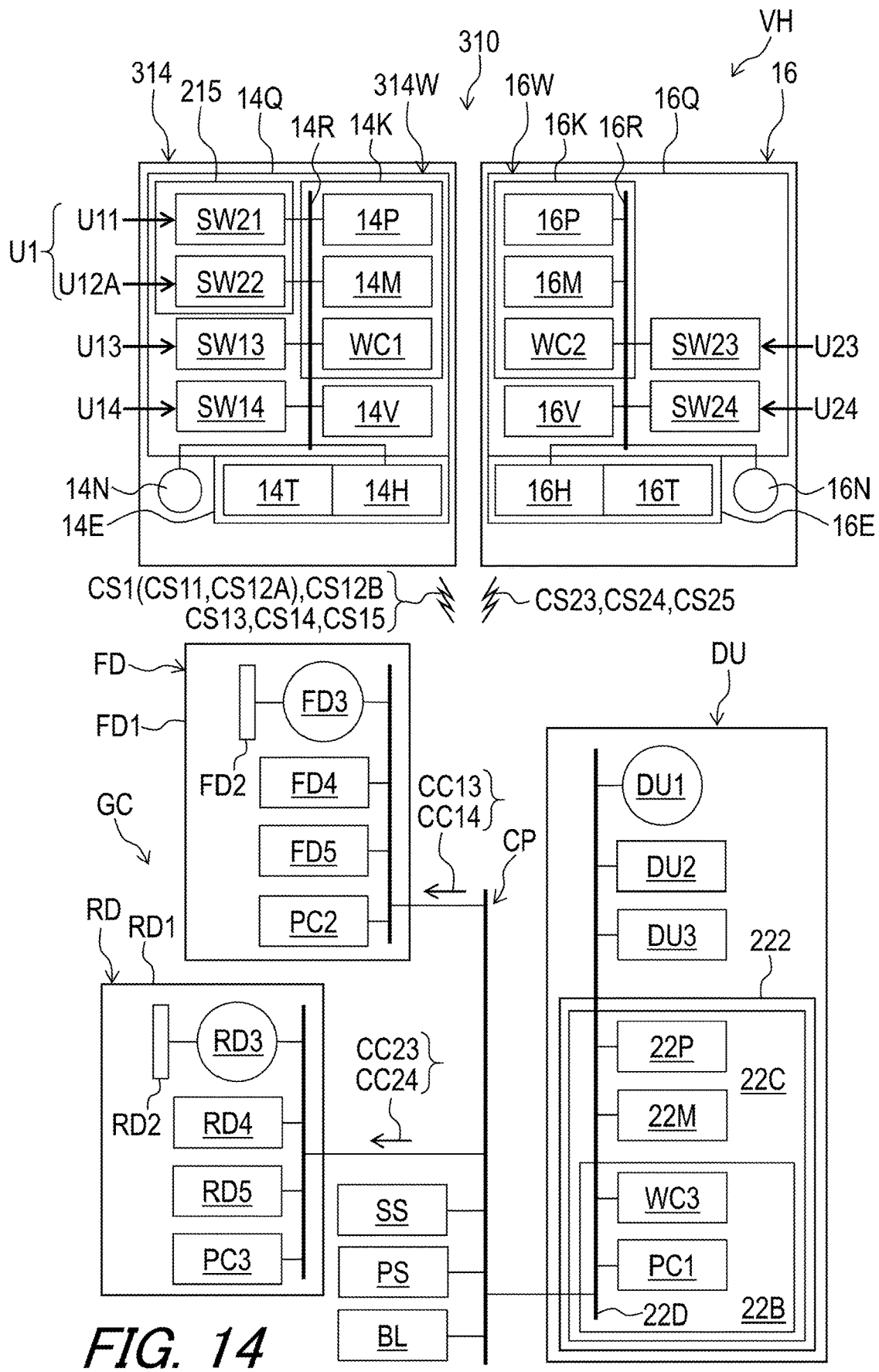
FIG. 14 is a schematic block diagram of a human-powered vehicle including an assist driving system in accordance with a third embodiment.

As seen in FIG. 14, the assist driving system 310 comprises an operating device 314, the assist driving unit DU, and the assist controller 222. The operating device 314 has substantially the same structure as the structure of the operating device 214 of the second embodiment. The operating device 314 for the human-powered vehicle VH comprises the base member 14A, the operating member 14B, and the assist operating interface 215.

Figure 15:
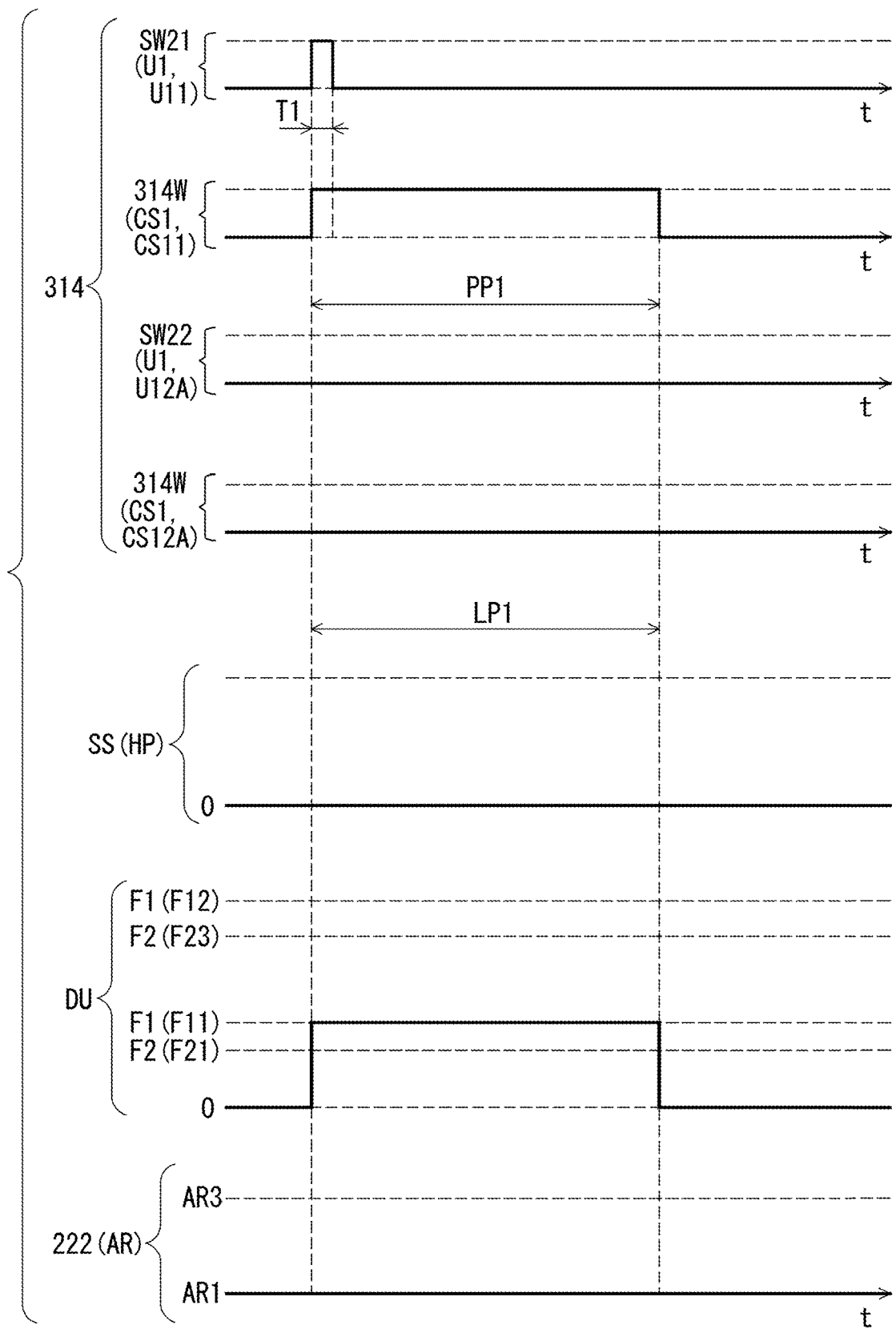
FIGS. 15 to 17 are timing charts of the assist driving system of the human-powered vehicle illustrated in FIG. 14.
Figure 16:
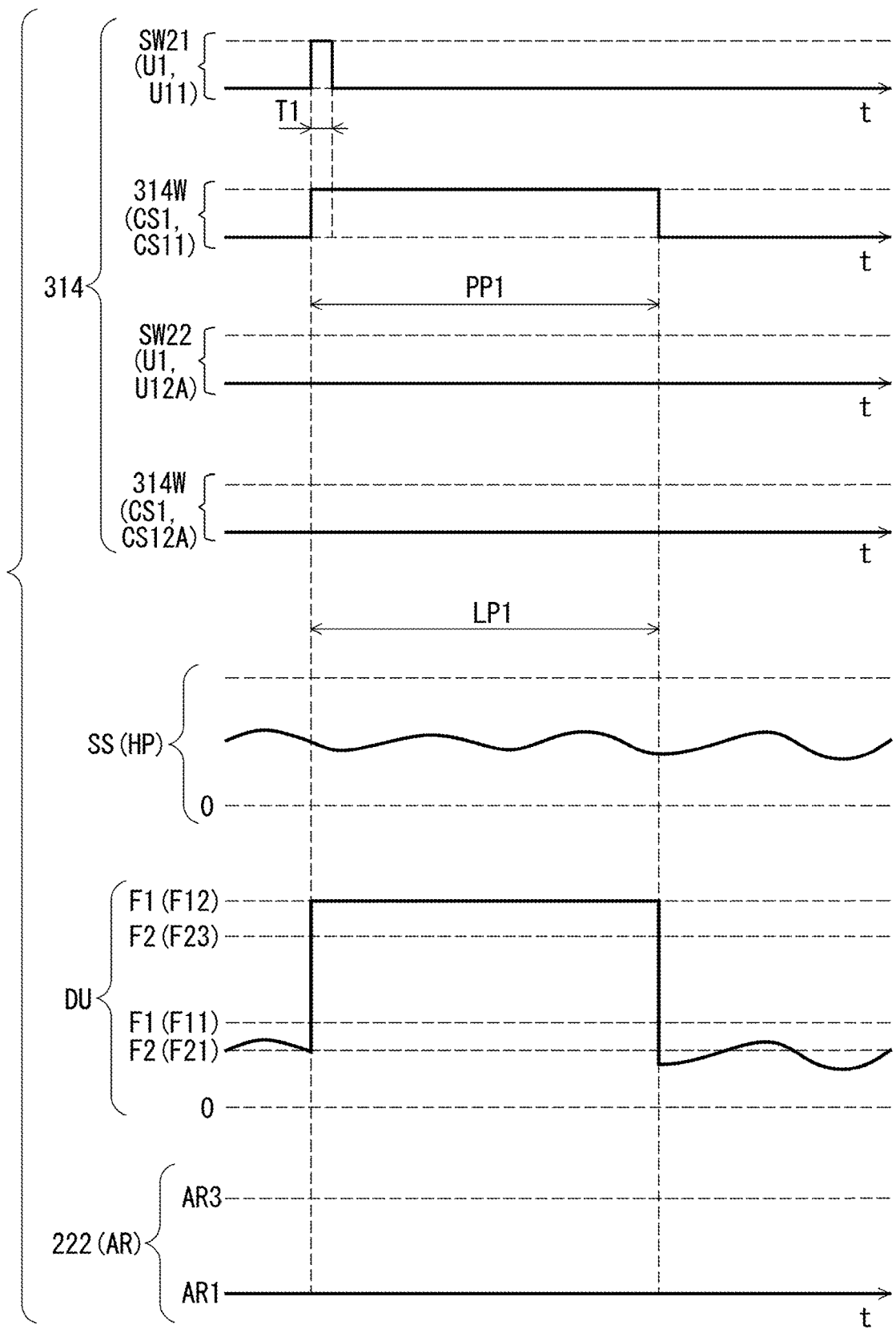

As seen in FIGS. 14 to 16, the operating device 314 further comprises a controller 314W, The controller 314W has substantially the same structure as the structure of the controller 14W of the first embodiment. In this embodiment, the controller 314W is configured to generate the first control signal CS11 for a predetermined period PP1 regardless of the first operate time T1 during which the assist operating interface 215 receives the first user input U11. The assist controller 222 is configured to control the assist driving unit DU to generate the temporary assist driving force F1 for the limited period LP1 corresponding to the predetermined period PP1. The predetermined period PP1 is arbitrarily changed using an interface such as a switch, a cycle computer, a smartphone, and a tablet computer. The controller 314W is configured to store the predetermined period PP1 in the memory 14M. The predetermined period PP1 is substantially equal to the limited period LP1.

Figure 17:
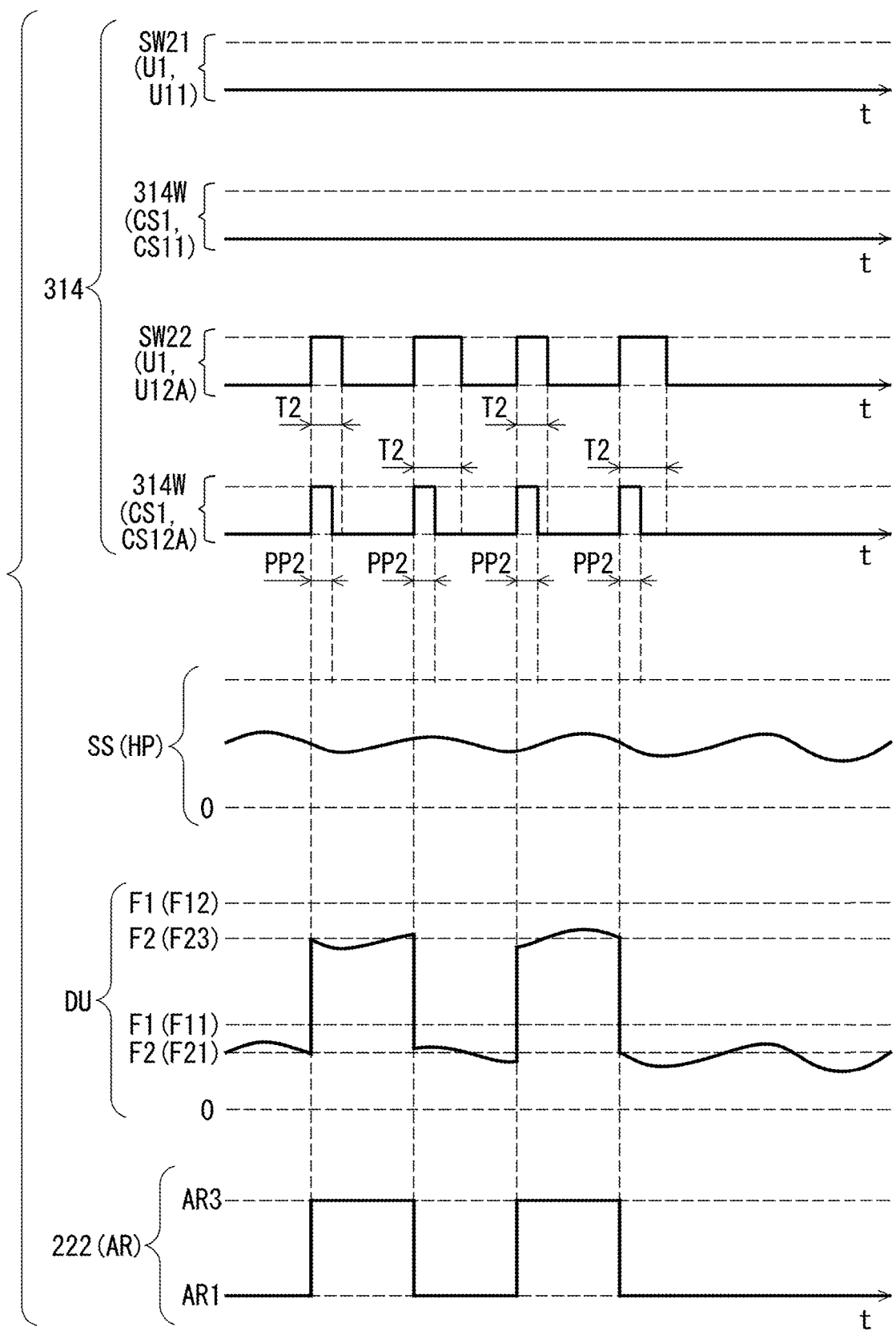

As seen in FIG. 17, the controller 314W is configured to generate the second control signal CS12A for an additional predetermined period PP2 regardless of the second operate time T2 during which the assist operating interface 215 receives the second user input U12. The additional predetermined period PP2 is shorter than the predetermined period PP1. The assist controller 222 is configured to select the third assist ratio AR3 in response to the second control signal CS12A when the current assist ratio is the first assist ratio AR1. The assist controller 222 is configured to select the first assist ratio AR1 in response to the second control signal CS12A when the current assist ratio is the third assist ratio AR3. The assist controller 222 is configured to control the assist driving unit DU to generate the assist driving force F2 calculated based on the selected assist ratio and the human power HP. The additional predetermined period PP2 does not relate to a period during which the assist driving unit DU generates the assist driving force F2 based on the selected assist ratio.

Fourth Embodiment

An assist driving system 410 in accordance with a fourth embodiment will be described below referring to FIGS. 18 to 23. The assist driving system 410 has the same structure and/or configuration as those of the assist driving system 210 except for the operating device 214 and the assist controller 222. Thus, elements having substantially the same function as those in the first embodiment will be numbered the same here and will not be described and/or illustrated again in detail here for the sake of brevity.

Figure 18:
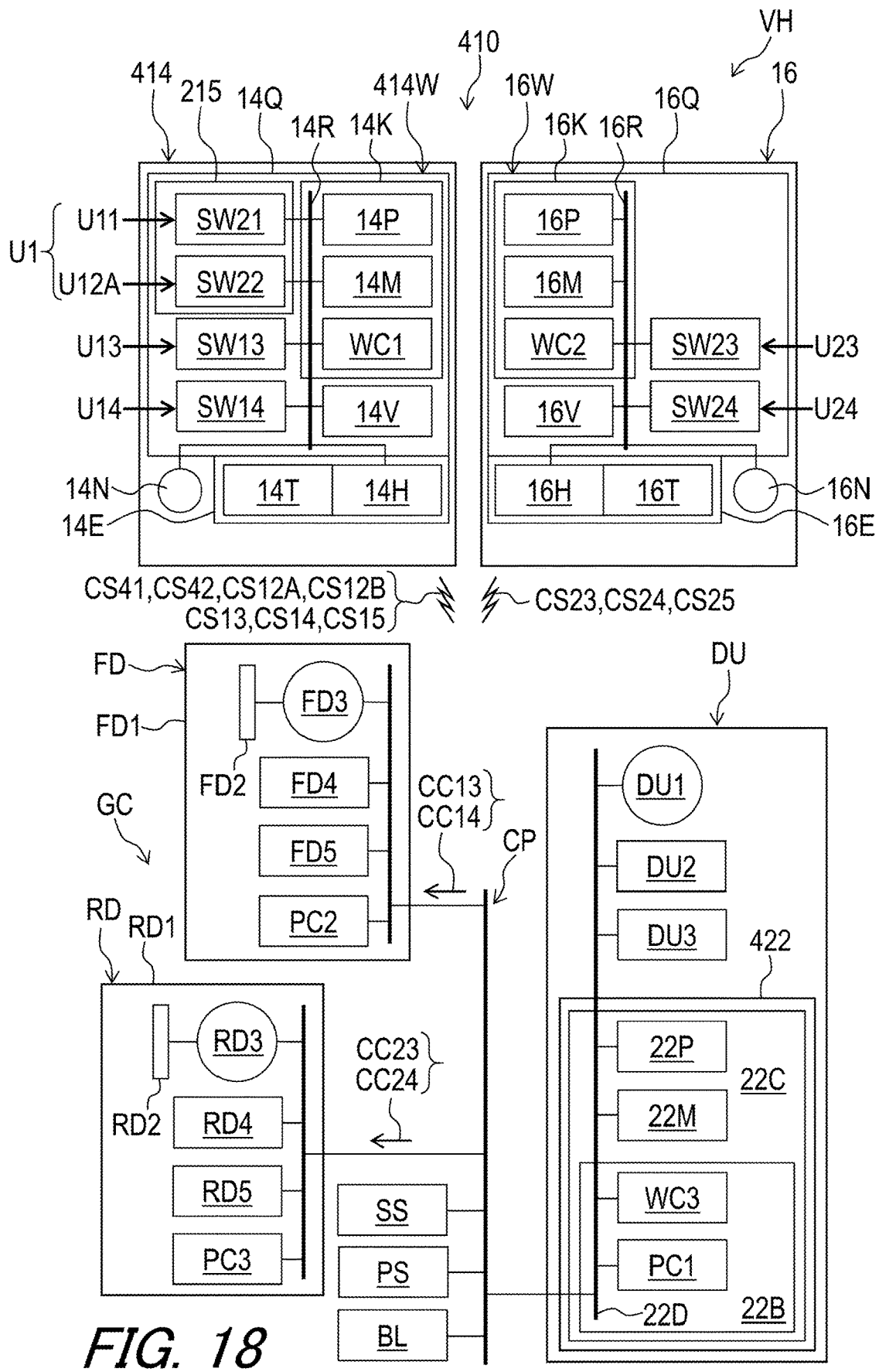
FIG. 18 is a schematic block diagram of a human-powered vehicle including an assist driving system in accordance with a fourth embodiment.

As seen in FIG. 18, the assist driving system 410 comprises an operating device 414, the assist driving unit DU, and an assist controller 422. The operating device 414 has substantially the same structure as the structure of the operating device 214 of the second embodiment. The operating device 414 for the human-powered vehicle VH comprises the base member 14A, the operating member 14B, and the assist operating interface 215.

Figure 19:
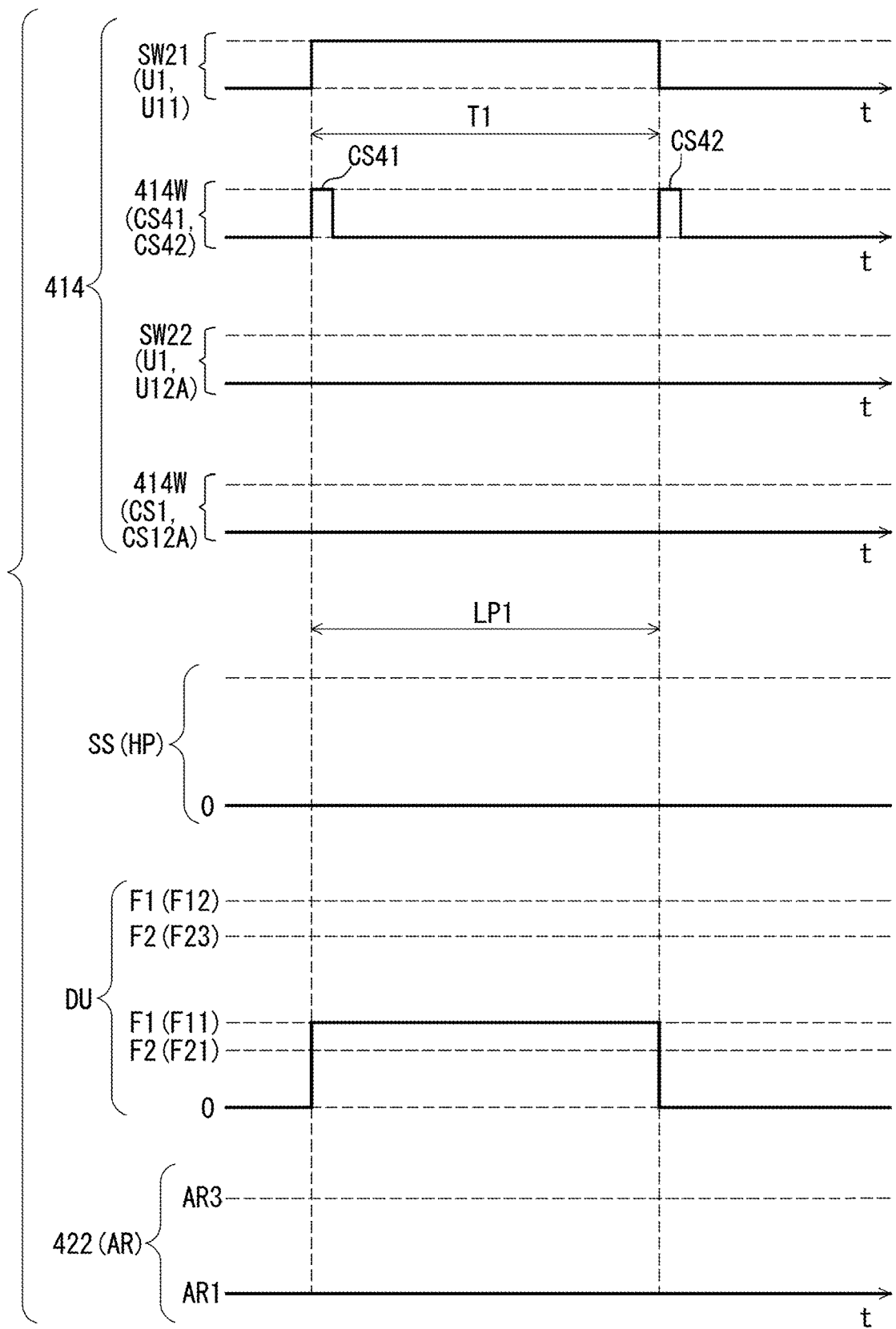
FIGS. 19 to 25 are timing charts of the assist driving system of the human-powered vehicle illustrated in FIG. 18.
Figure 20:
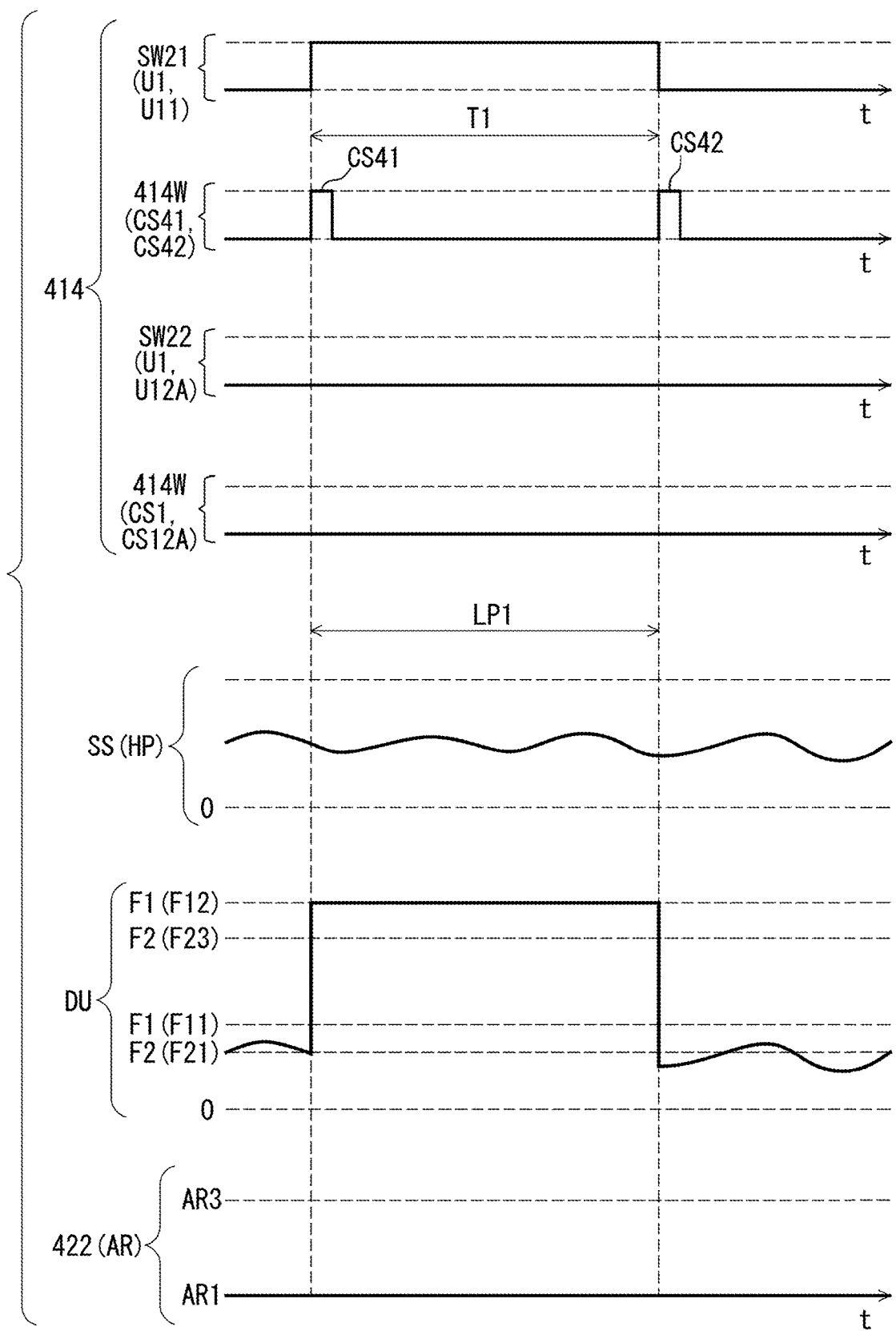
Figure 21:
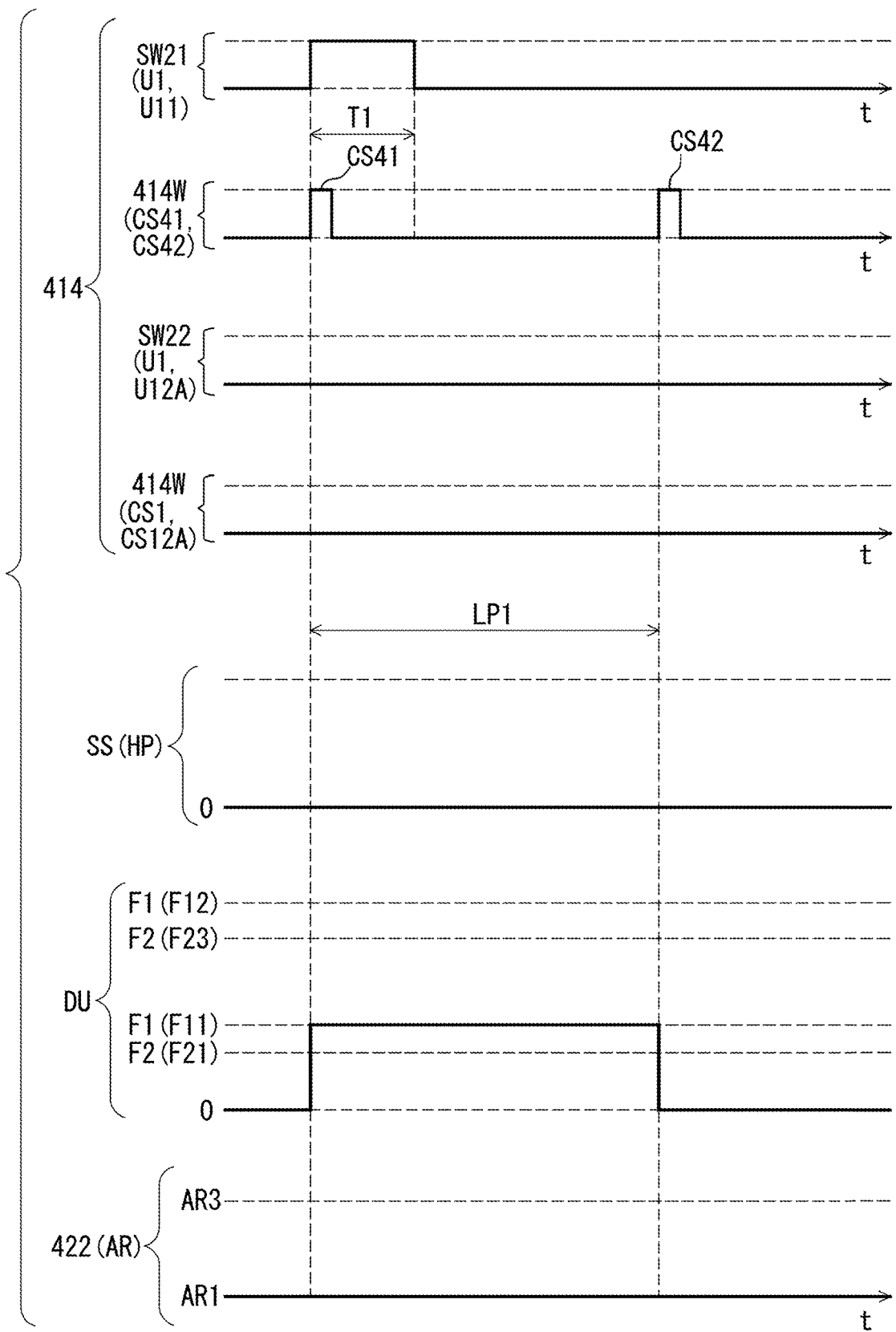
Figure 22:
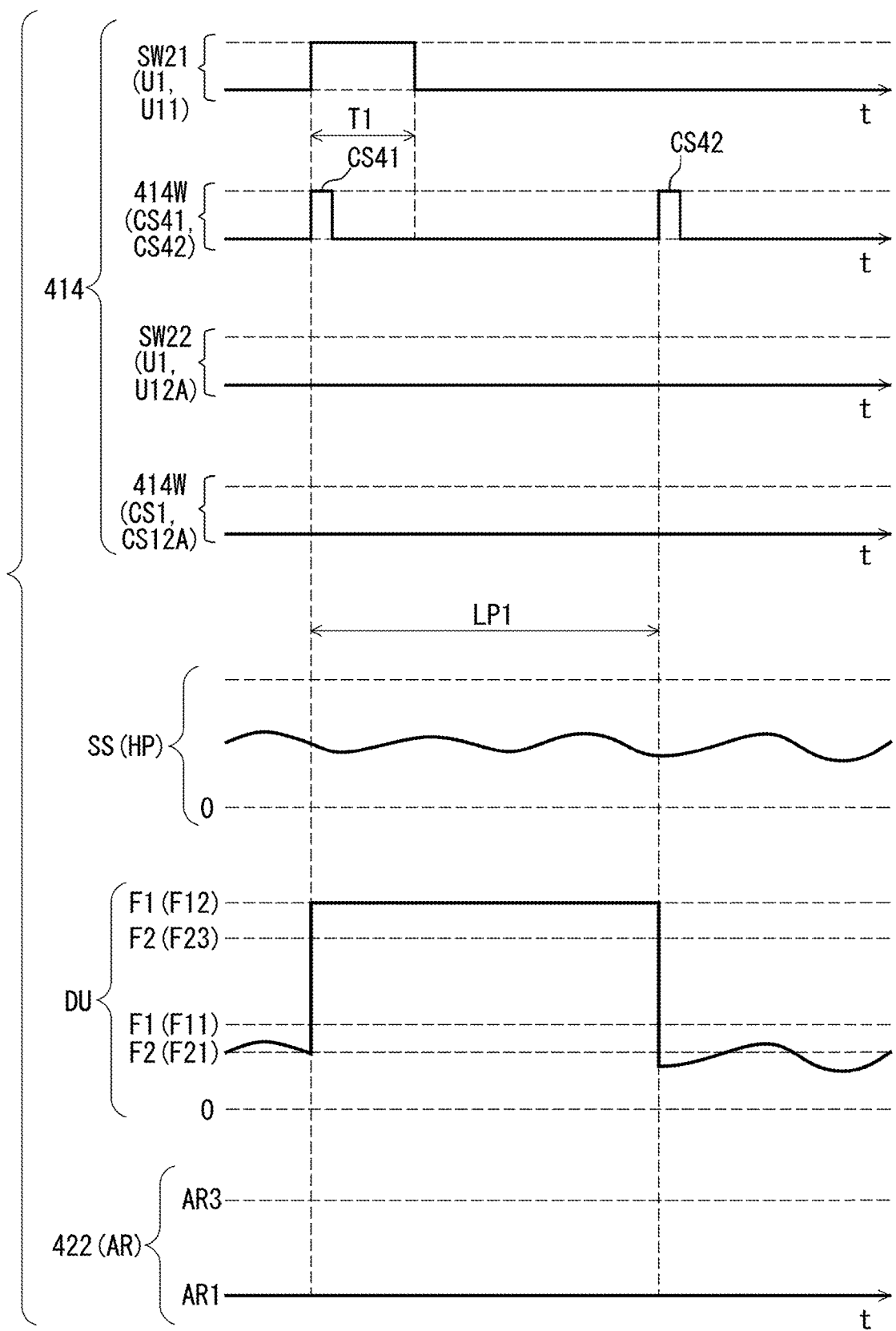
Figure 23:
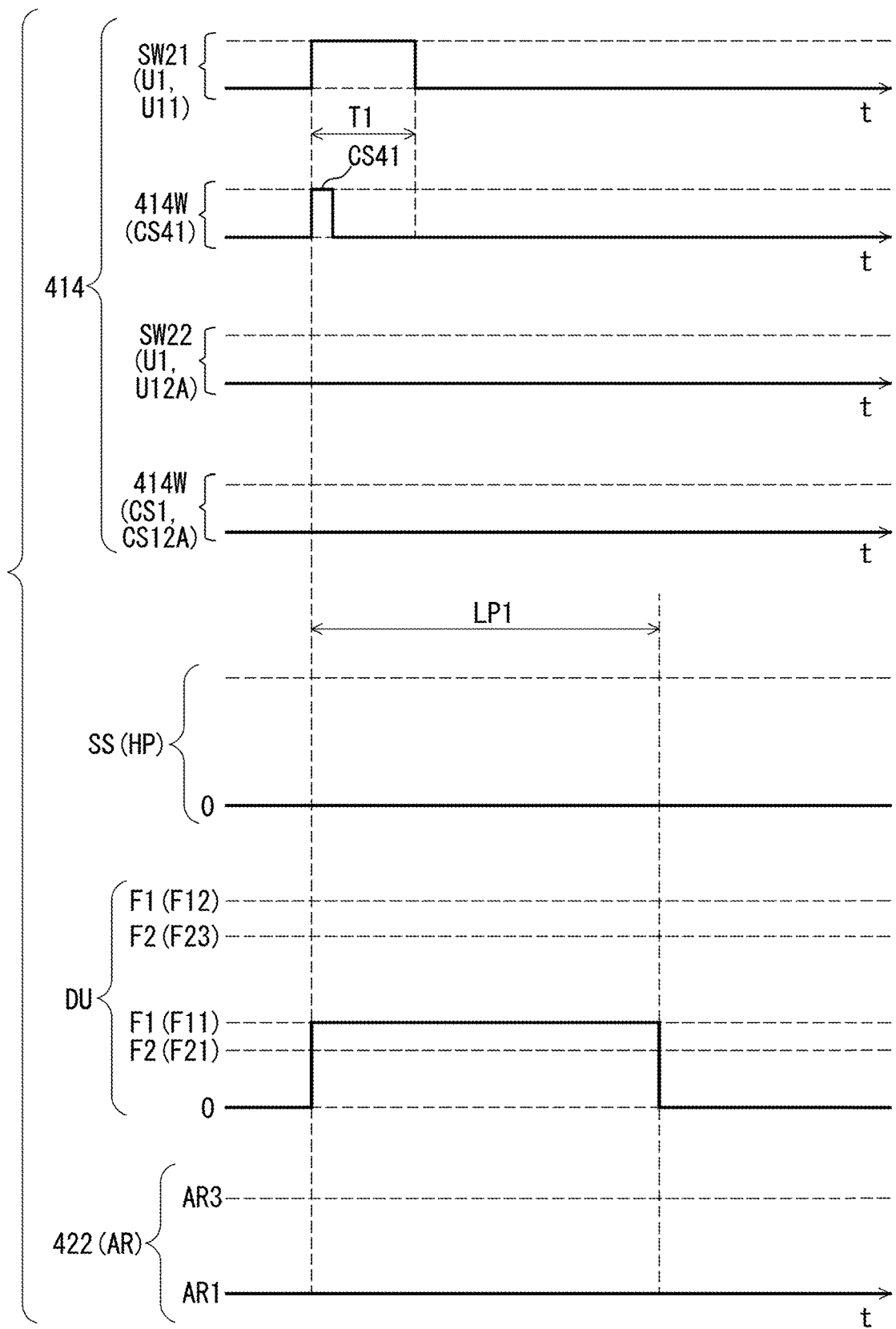
Figure 24:
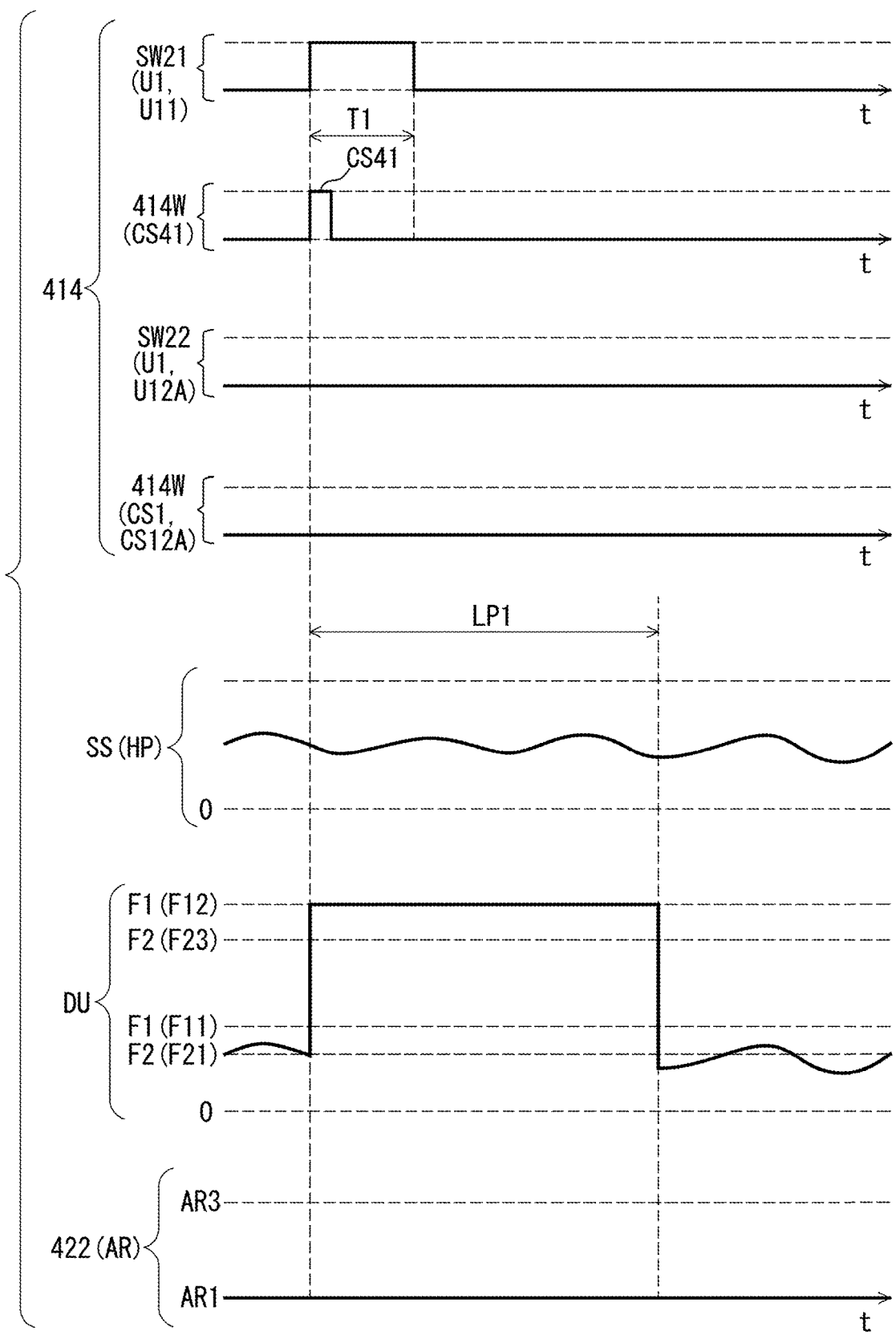

As seen in FIGS. 18 to 20, the operating device 414 further comprises a controller 414W. The controller 414W has substantially the same structure as the structure of the controller 314W of the third embodiment. In this embodiment, the controller 414W is configured to generate a first control signal CS41 in response to an initiation of the first user input U11. The controller 414W is configured to generate a first control termination signal CS42 indicating that the assist driving unit DU stops generating the temporary assist driving force F1 in accordance with one of a termination of the first user input U11 and a lapse of the limited period LP1 from the initiation of the first user input U11. In this embodiment, the controller 414W is configured to generate the first control termination signal CS42 indicating that the assist driving unit DU stops generating the temporary assist driving force F1 in accordance with the termination of the first user input U11. As seen in FIGS. 21 and 22, however, the controller 414W can be configured to generate the first control termination signal CS42 indicating that the assist driving unit DU stops generating the temporary assist driving force F1 in accordance with a lapse of the limited period LP1 from the initiation of the first user input U11. Furthermore, as seen in FIGS. 23 and 24, the assist controller 422 can be configured to generate the temporary assist driving force F1 for the limited period LP1 from receipt of the first control signal CS41. In this modification, the first control termination signal CS42 can be omitted.

As seen in FIGS. 19 and 20, in this embodiment, the assist controller 422 is configured to identify each of the first control signal CS41 and the first control termination signal CS42 regardless of signal lengths of the first control signal CS41 and the first control termination signal CS42. Thus, the assist controller 422 is configured not to determine whether the first operate time T1 of the user input U1 received by the electrical switch SW11 is equal to or shorter than the determination time DT.

The assist controller 422 is configured to control the assist driving unit DU to generate the temporary assist driving force F1 in response to the first user input U11. The assist controller 422 is configured to control the assist driving unit DU to generate the temporary assist driving force F1 in response to the first control signal CS41. The assist controller 422 is configured to control the assist driving unit DU to stop generating the temporary assist driving force F1 in response to the first control termination signal CS42.

The assist controller 422 is configured to control the assist driving unit DU to generate the temporary assist driving force F11 for the limited period LP1 in response to the first control signal CS41 if the human power HP is zero and if the rotational speed sensed by the speed sensor SS is lower than the predetermined rotational speed. The assist controller 422 is configured to control the assist driving unit DU to start to generate the temporary assist driving force F11 in response to the first control signal CS41 if the human power HP is zero and if the rotational speed sensed by the speed sensor SS is lower than the predetermined rotational speed. The assist controller 422 is configured to control the assist driving unit DU to stop generating the temporary assist driving force F11 in response to the first control termination signal CS42.

The assist controller 422 is configured to control the assist driving unit DU to generate the temporary assist driving force F12 for the limited period LP1 in response to the first control signal CS41 if the human power HP is larger than zero. The assist controller 422 is configured to control the assist driving unit DU to start to generate the temporary assist driving force F12 in response to the first control signal CS41 if the human power HP is larger than zero. The assist controller 422 is configured to control the assist driving unit DU to stop generating the temporary assist driving force F12 in response to the first control termination signal CS42.

Figure 25:
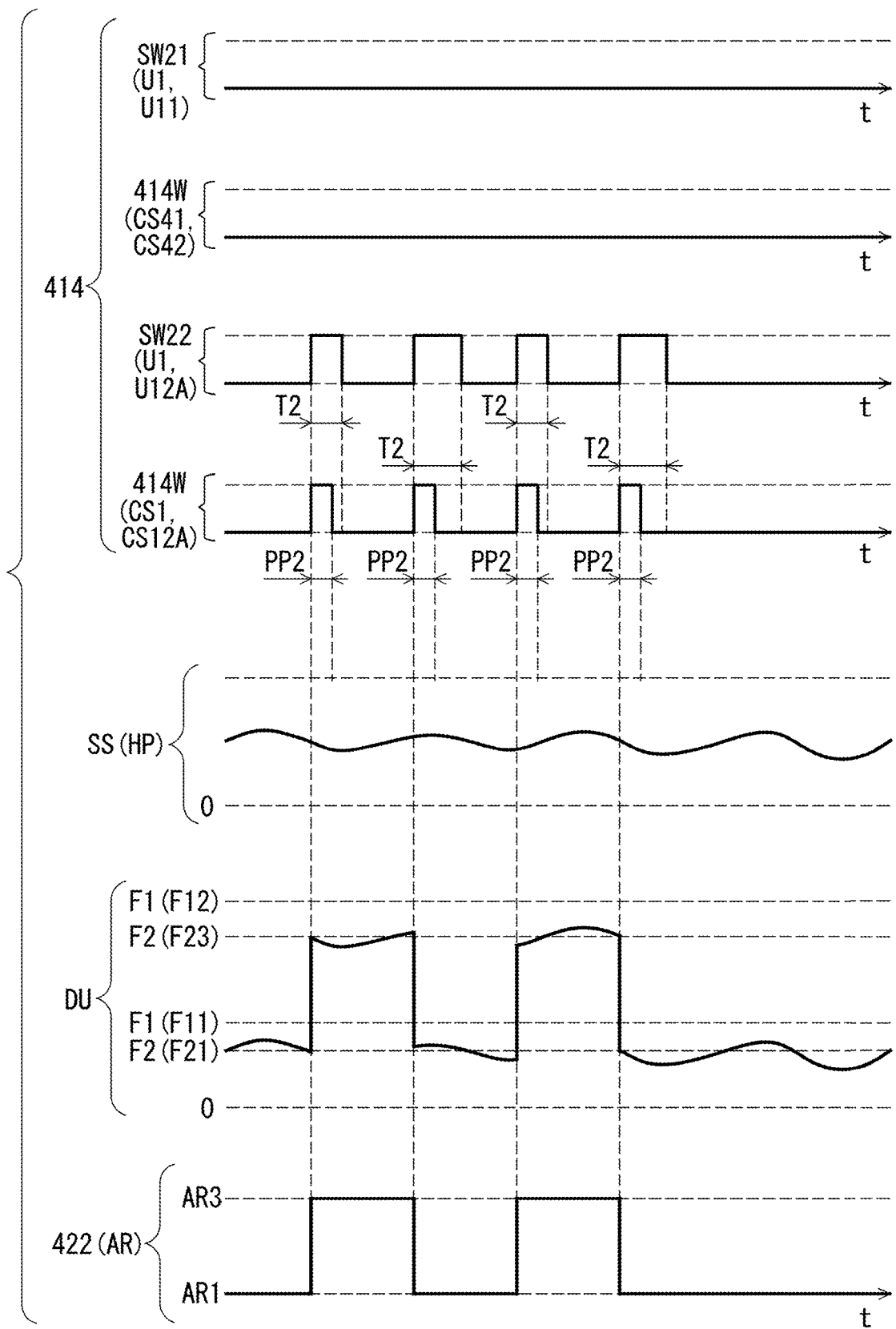

As seen in FIG. 25, the controller 414W is configured to generate the second control signal CS12A for a predetermined period PP2 regardless of the second operate time T2 during which the assist operating interface 215 receives the second user input U12.

Fifth Embodiment

An assist driving system 510 in accordance with a fifth embodiment will be described below referring to FIG. 26. The assist driving system 510 has the same structure and/or configuration as those of the assist driving system 10 except for the operating device 14 and the assist controller 22. Thus, elements having substantially the same function as those in the first embodiment will be numbered the same here and will not be described and/or illustrated again in detail here for the sake of brevity.

Figure 26:
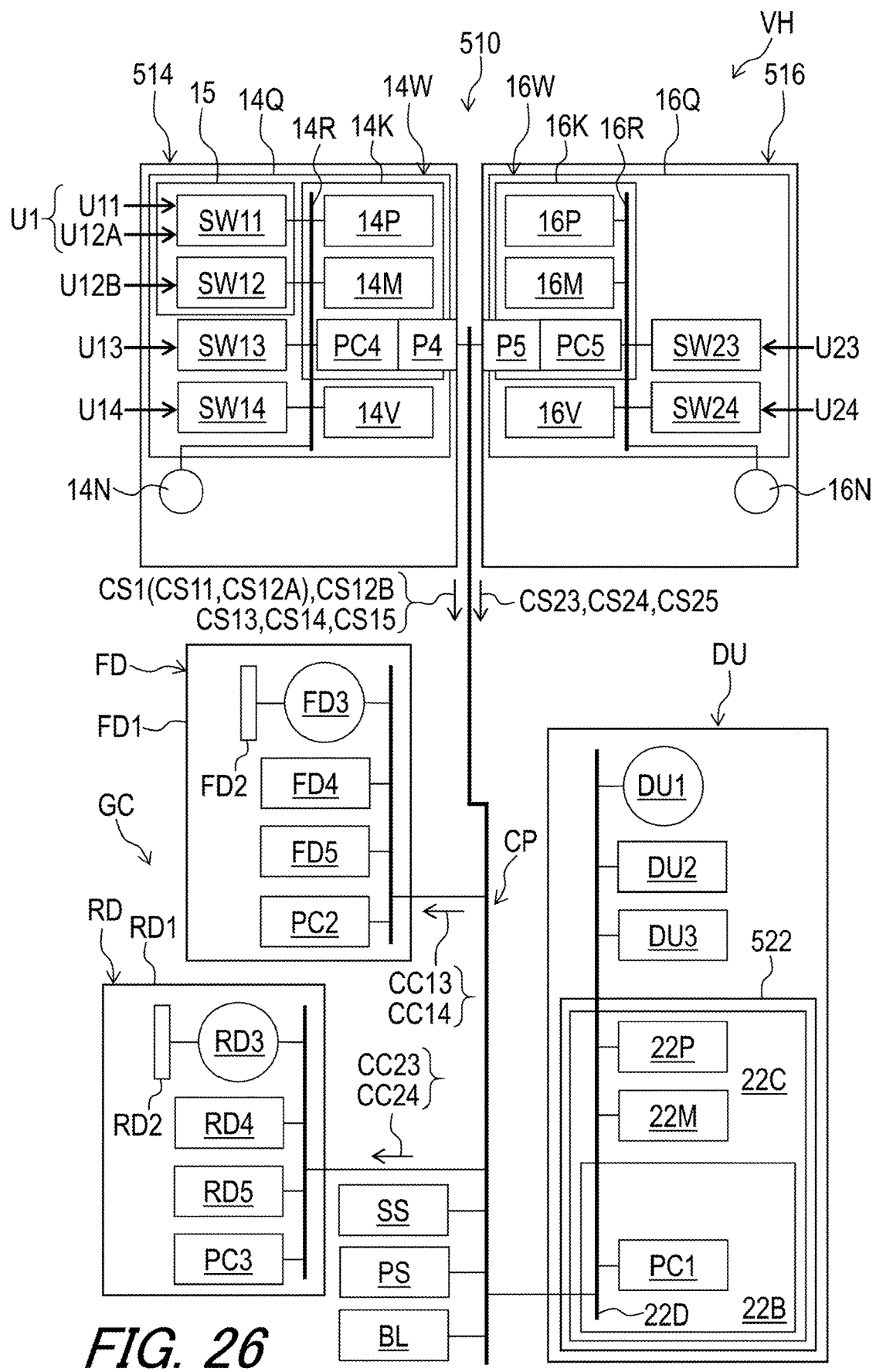
FIG. 26 is a schematic block diagram of a human-powered vehicle including an assist driving system in accordance with a fifth embodiment.

As seen in FIG. 26, the assist driving system 510 comprises an operating device 514, the assist driving unit DU, and an assist controller 522. The assist driving system 510 comprises an operating device 516. The operating device 514 has substantially the same structure as the structure of the operating device 14 of the first embodiment. The operating device 516 has substantially the same structure as the structure of the operating device 16 of the first embodiment.

The operating device 514 for the human-powered vehicle VH comprises the assist operating interface 15. The wireless communicator WC1 is omitted from the operating device 514. Instead, the operating device 514 further comprises a communication port P4. The communication port P4 is configured to be connected to a cable. The communication port P4 is configured to be detachably connected to the cable. The communication port P4 is electrically connected to the controller 14W to transmit the first control signal CS11 through the communication port P4. The communication port P4 is electrically connected to the controller 14W to transmit the second control signal CS12A through the communication port P4.

As with the operating device 514, the wireless communicator WC2 is omitted from the operating device 516. The operating device 516 further comprises a communication port P5. The communication port P5 is configured to be connected to a cable. The communication port P5 is configured to be detachably connected to the cable. The communication port P5 is electrically connected to the controller 16W to transmit the first additional control signal CS23 through the communication port P5. The communication port P5 is electrically connected to the controller 16W to transmit the second additional control signal CS24 through the communication port P5.

The power supply PS supplies electricity to the operating devices 14 and 16 through the electric communication path CP. Thus, the electric power sources 14E and 16E can be respectively omitted from the operating devices 14 and 16.

The wireless communicator WC3 is omitted from the assist controller 522. The operating device 514 includes a PLC controller PC4 electrically connected to the communication port P4. The operating switch device 216 includes a PLC controller PC5 electrically connected to the communication port P5. The PLC controllers PC4 and PC5 have substantially the same structure as the structure of the PLC controller PC1. Thus, they will not be described in detail for the sake of brevity.

Modifications

In the above embodiments and the modifications, as seen in FIGS. 4 and 9, the base member 14A includes the grip portion 14G, and the base member 16A includes the grip portion 16G. However, the grip portion 14G can be omitted from the base member 14A. The grip portion 16G can be omitted from the base member 16A. Namely, at least one of the assist operating interfaces 15 and 215 can apply to operating devices other than the road-type operating device.

In the above embodiments and the above modifications, as seen in FIG. 8, the operating device 14 is provided on the left side with respect to the center plane VH6 of the human-powered vehicle VH. The operating device 16 is provided on the right side with respect to the center plane VH6 of the human-powered vehicle VH. However, the operating device 14 can be provided on the right side with respect to the center plane VH6 of the human-powered vehicle VH. The operating device 16 can be provided on the left side with respect to the center plane VH6 of the human-powered vehicle VH. The operating device 14 and the operating device 16 can be provided on the same side with respect to the center plane VH6 of the human-powered vehicle VH.

In the above embodiments and the above modifications, as seen in FIGS. 4 and 9, the operating member 14B includes the lower end 14L and the upper end 14U. The operating member 16B includes the lower end 16L and the upper end 16U. However, the structure of the operating member 14B is not limited to the above embodiments and the above modifications. The structure of the operating member 16B is not limited to the above embodiments and the above modifications.

In the above embodiments and the above modifications, the assist controller 22, 222, 422, or 522 is configured to generate the temporary assist driving force F12 as the boost mode. However, at least one of the assist controllers 22, 222, 422, and 522 can be configured to restrict a total number of use of the temporary assist driving force F12 during a predetermined travel period or mileage. For example, this can be used in an E-bike race. Specifically, the total number of use of the boost mode is limited to a predetermined number of use (e.g., two or three) in one race. A period of use of the boost mode is limited to a predetermined period of use (e.g., 5 seconds) in one race. At least one of the predetermined number of use and the predetermined period of use can be arbitrarily changed using an interface such as a switch, a cycle computer, a smartphone, and a tablet computer.

In the above embodiments and the above modifications, the assist controller 22, 222, or 422 is configured to control the gear changing device GC to change the gear ratio of the gear changing device GC based on one of the first additional user input U13, the second additional user input U14, the first additional user input U23, and the second additional user input U24. However, at least one of the first additional user input U13, and the second additional user input U14, the first additional user input U23, and the second additional user input U24 can be used to operate another electric component such as the gear changing unit FD, the gear changing unit RD, an adjustable seatpost, an internal gear hub, a front suspension, a rear suspension, a cycle computer, a smartphone, a tablet computer, or a light emitting device.

In the above embodiment and the above modifications thereof, the electrical switch SW11 and the additional electrical switch SW12 are mounted to the operating device 14 or 514. The first electrical switch SW21 and the second electrical switch SW22 are mounted to the operating device 214, 314, or 414. However, at least one of the electrical switch SW11 and the additional electrical switch SW12 can be mounted to the operating device 16 or 516. At least one of the first electrical switch SW21 and the second electrical switch SW22 can be mounted to the operating device 16 or 516.

In the above embodiments and the above modifications, the gear changing device GC includes the gear changing units FD and RD. However, the gear changing unit FD can be omitted from the gear changing device GC. In such modification, the first additional switch SW13 and the second additional switch SW14 can be omitted from the operating device 14, 214, 314, 414, or 514.

The PLC controllers PC4 and PC5 of the fifth embodiment can apply to the first to fourth embodiments and the modifications thereof.

In the first embodiment, the assist operating interface 15 includes the electrical switch SW11 and the additional electrical switch SW12. However, the additional electrical switch SW12 can be omitted from the assist operating interface 15. In such modification, as with the second to fourth embodiments, the plurality of assist ratios AR includes the first assist ratio AR1 and the third assist ratio AR3, and the second assist ratio AR2 is omitted from the plurality of assist ratios AR.

In the first embodiment, the assist controller 22 is configured to calculate the temporary assist driving force F1 based on the value stored in the memory 22M in each of the walk mode and the boost mode. This can apply to the second to fifth embodiments and the modifications thereof. Furthermore, the assist controller 22 can be configured to calculate the temporary assist driving force F1 based on other information.

Figure 27:
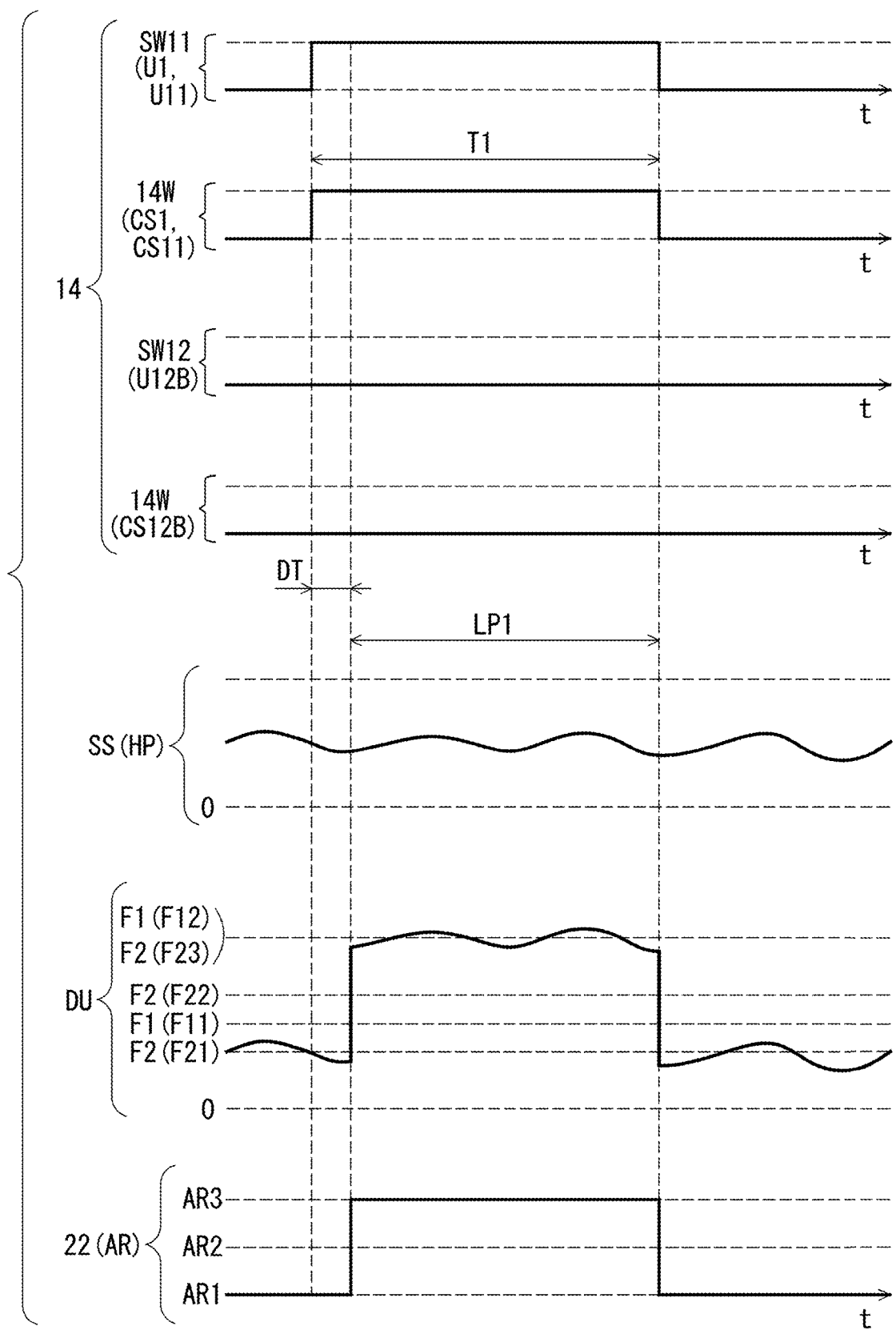
FIG. 27 is a timing chart of a human-powered vehicle including an assist driving system in accordance with a modification of the first embodiment.

In the first embodiment, the assist controller 22 is configured to calculate the temporary assist driving force F12 based on the maximum torque and the maximum rotational speed which are stored in the memory 22M. As seen in FIG. 27, however, the temporary assist driving force F12 can be calculated as a function of the human power HP. In such modification, for example, the assist controller 22 is configured to calculate the temporary assist driving force F12 based on the human power HP and the third assist ratio AR3 of a temporary assist ratio substantially corresponding to the third assist ratio AR3. The assist controller 22 is configured to calculate the assist driving force F11 based on the human power HP and the selected assist ratio (e.g., the first assist ratio AR1 in FIG. 27) after a lapse of the limited period LP1. The same modification can apply to other embodiments and/or other modifications.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. An operating device for a human-powered vehicle, comprising:
   a base member including
   a coupling end configured to be coupled to a handlebar,
   a free end opposite to the coupling end, and
   a grip portion provided between the coupling end and the free end;
   an operating member pivotally coupled to the base member about a pivot axis; and
   an assist operating interface configured to receive a first user input indicating that an assist driving unit generates a temporary assist driving force for a limited period corresponding to an operation of the first user input and ends the temporary assist drive force after the limited period expires without need for additional user input to end the temporary assist drive force.

2. The operating device according to claim 1, wherein the assist operating interface configured to receive a second user input indicating that an assist driving unit changes an assist ratio which is a ratio of an assist driving force generated by the assist driving unit to the human power.

3. The operating device according to claim 2, wherein the assist operating interface of the operating device includes an electrical switch configured to receive the first user input with a first manner, and the second user input with a second manner different from the first manner.

4. The operating device according to claim 3, wherein the first manner includes a first operate time during which the electrical switch is operated,
the second manner includes a second operate time during which the electrical switch is operated, and
the second operate time is different from the first operate time.

5. The operating device according to claim 4, wherein the first operate time is longer than the second operate time.

6. The operating device according to claim 2, wherein the assist operating interface includes
a first electrical switch configured to receive the first user input, and
a second electrical switch configured to receive the second user input.

7. An assist driving system comprising:
the operating device according to claim 1;
the assist driving unit configured to generate an assist driving force to assist the human power; and
an assist controller configured to control the assist driving unit based on the first user input.

8. The assist driving system according to claim 7, wherein the assist operating interface is configured to receive a second user input indicating that an assist driving unit changes an assist ratio which is a ratio of an assist driving force generated by the assist driving unit to a human power, and
the assist controller configured to control the assist driving unit based on the first user input and the second user input.

9. The assist driving system according to claim 7, wherein the assist controller is configured to control the assist driving unit to generate the temporary assist driving force in response to the first user input.

10. The assist driving system according to claim 7, wherein
the assist controller is configured to select one assist ratio of a plurality of assist ratios based on the second user input, and
the assist controller is configured to control the assist driving unit to generate an assist driving force based on an assist ratio selected by the assist controller.

11. The assist driving system according to claim 7, wherein
the operating device comprises a controller,
the controller is configured to generate, based on the first user input, a first control signal indicating that the assist driving unit generates the temporary assist driving force for the limited period, and
the controller is configured to generate, based on the second user input, a second control signal indicating that the assist driving unit changes the assist ratio.

12. The assist driving system according to claim 11, wherein
the controller is configured to generate the first control signal for a first operate time during which the assist operating interface receives the first user input.

13. The assist driving system according to claim 11, wherein
the controller is configured to generate the first control signal for a predetermined period regardless of a first operate time during which the assist operating interface receives the first user input.

14. The assist driving system according to claim 11, wherein
the assist controller is configured to select one assist ratio of a plurality of assist ratios based on the second control signal, and
the assist controller is configured to control the assist driving unit to generate an assist driving force based on an assist ratio selected by the assist controller.

15. The assist driving system according to claim 14, wherein
the assist controller is configured to control the assist driving unit to generate the assist driving force based on the assist ratio selected by the assist controller while the assist controller does not receive the first control signal.

16. The assist driving system according to claim 11, wherein
the assist controller is configured to control the assist driving unit to generate the temporary assist driving force in response to the first control signal.

17. The assist driving system according to claim 16, wherein
the assist controller is configured to control the assist driving unit to change a driving force generated by the assist driving unit from the temporary assist driving force to the assist driving force generated based on the assist ratio one of after a termination of the first control signal and after a predetermined period elapses from the termination of the first control signal.

18. An operating device for a human-powered vehicle, comprising:
a base member;
an operating member pivotally coupled to the base member about a pivot axis, the operating member including a lower end and an upper end that is closer to the base member than the lower end, the lower end being positioned below the upper end while the operating device is mounted to a handlebar; and
an assist operating interface configured to receive a first user input indicating that an assist driving unit generates a temporary assist driving force for a limited period corresponding to an operation of the first user input and receiving the first user input ends the temporary assist drive force after the limited period expires without need for additional user input to end the temporary assist drive force.

19. An operating device for a human-powered vehicle, comprising:
a base member including
a coupling end configured to be coupled to a handlebar,
a free end opposite to the coupling end, and
a grip portion provided between the coupling end and the free end;
an operating member pivotally coupled to the base member about a pivot axis;
an assist operating interface configured to receive a first user input indicating that an assist driving unit generates a temporary assist driving force for a limited period corresponding to an operation of the first user input; and
a controller configured to generate, based on the first user input, a first control signal indicating that the assist driving unit generates the temporary assist driving force for the limited period, wherein
the assist operating interface is configured to receive a second user input indicating that an assist driving unit changes an assist ratio which is a ratio of an assist driving force generated by the assist driving unit to the human power, and the controller is configured to generate, based on the second user input, a second control signal indicating that the assist driving unit changes the assist ratio.

20. The operating device according to claim 19, wherein the controller is configured to generate the first control signal for a first operate time during which the assist operating interface receives the first user input.

21. The operating device according to claim 19, wherein the controller is configured to generate the first control signal for a predetermined period regardless of a first operate time during which the assist operating interface receives the first user input.

22. The operating device according to claim 19, wherein the controller is configured to generate the first control signal in response to an initiation of the first user input, and the controller is configured to generate a first control termination signal indicating that the assist driving unit stops generating the temporary assist driving force in accordance with one of a termination of the first user input and a lapse of the limited period from the initiation of the first user input.

23. The operating device according to claim 19, further comprising
a communication port configured to be connected to a cable, the communication port being electrically connected to the controller to transmit the first control signal through the communication port.

24. The operating device according to claim 23, wherein the communication port is electrically connected to the controller to transmit the second control signal through the communication port.

25. The operating device according to claim 19, further comprising
a wireless communicator configured to wirelessly transmit the first control signal.

26. The operating device according to claim 25, further comprising
a wireless communicator configured to wirelessly transmit the second control signal.

27. An operating device for a human-powered vehicle, comprising:
a base member including
a coupling end configured to be coupled to a handlebar,
a free end opposite to the coupling end, and
a grip portion provided between the coupling end and the free end;
an operating member pivotally coupled to the base member about a pivot axis; and
an assist operating interface configured to receive a first user input indicating that an assist driving unit generates a temporary assist driving force for a limited period corresponding to an operation of the first user input and ends the temporary assist drive force when the first user input ends, wherein
the temporary assist drive force is generated after an expiration of a determination time that begins at an initial actuation of the first user input, the determination time being a non-zero period of time.

28. The operating device according to claim 27, further comprising
a controller configured to generate, based on the first user input, a first control signal indicating that the assist driving unit generates the temporary assist driving force for the limited period.

* * * * *